United States Patent
Cardona

(10) Patent No.: US 9,716,903 B2
(45) Date of Patent: Jul. 25, 2017

(54) LIVE STREAMING-TV CONTENT, ACQUISITION, TRANSFORMATION, ENCRYPTION, AND DISTRIBUTION SYSTEM, AND METHOD FOR ITS USE

(71) Applicant: Diego Cardona, Boone, NC (US)

(72) Inventor: Diego Cardona, Boone, NC (US)

(*) Notice: Subject to any disclaimer, the term of this patent is extended or adjusted under 35 U.S.C. 154(b) by 0 days.

(21) Appl. No.: 14/815,559

(22) Filed: Jul. 31, 2015

(65) Prior Publication Data
US 2016/0037215 A1 Feb. 4, 2016

Related U.S. Application Data

(60) Provisional application No. 62/031,229, filed on Jul. 31, 2014.

(51) Int. Cl.
| | |
|---|---|
| H04N 7/167 | (2011.01) |
| H04N 21/2187 | (2011.01) |
| H04N 21/845 | (2011.01) |
| G11B 27/10 | (2006.01) |
| H04N 21/218 | (2011.01) |
| H04N 21/2347 | (2011.01) |
| H04N 21/2343 | (2011.01) |
| H04N 21/2747 | (2011.01) |

(52) U.S. Cl.
CPC ......... *H04N 21/2187* (2013.01); *G11B 27/10* (2013.01); *H04N 21/2181* (2013.01); *H04N 21/2347* (2013.01); *H04N 21/234309* (2013.01); *H04N 21/2747* (2013.01); *H04N 21/8456* (2013.01)

(58) Field of Classification Search
CPC .................. H04N 21/2187; H04N 21/2181
See application file for complete search history.

(56) References Cited

U.S. PATENT DOCUMENTS

| | | | | |
|---|---|---|---|---|
| 2008/0273519 A1* | 11/2008 | Sedeffow | ........... | H04N 7/17318 370/345 |
| 2012/0265892 A1* | 10/2012 | Ma | ................... | H04N 21/23418 709/231 |
| 2013/0283033 A1* | 10/2013 | Ahuja | ................... | H04L 9/3213 713/150 |
| 2015/0007239 A1* | 1/2015 | Cranman | ........... | H04N 21/2402 725/95 |

* cited by examiner

*Primary Examiner* — Olugbenga Idowu
(74) *Attorney, Agent, or Firm* — Blake E. Vande Garde; Erickson Kernell IP, LLC

(57) ABSTRACT

A system for delivering audio and video to one or more users comprising a video/audio receiver, an encoder process/encoder machine operationally associated with the video/audio receiver, an UPLOADer Process/machine operationally associated with the encoder process/encoder machine, a Content Delivery Network (CDN) operationally associated with the UPLOADer Process/machine and one or more client/subscriber machines operationally associated with the CDN.

18 Claims, 21 Drawing Sheets

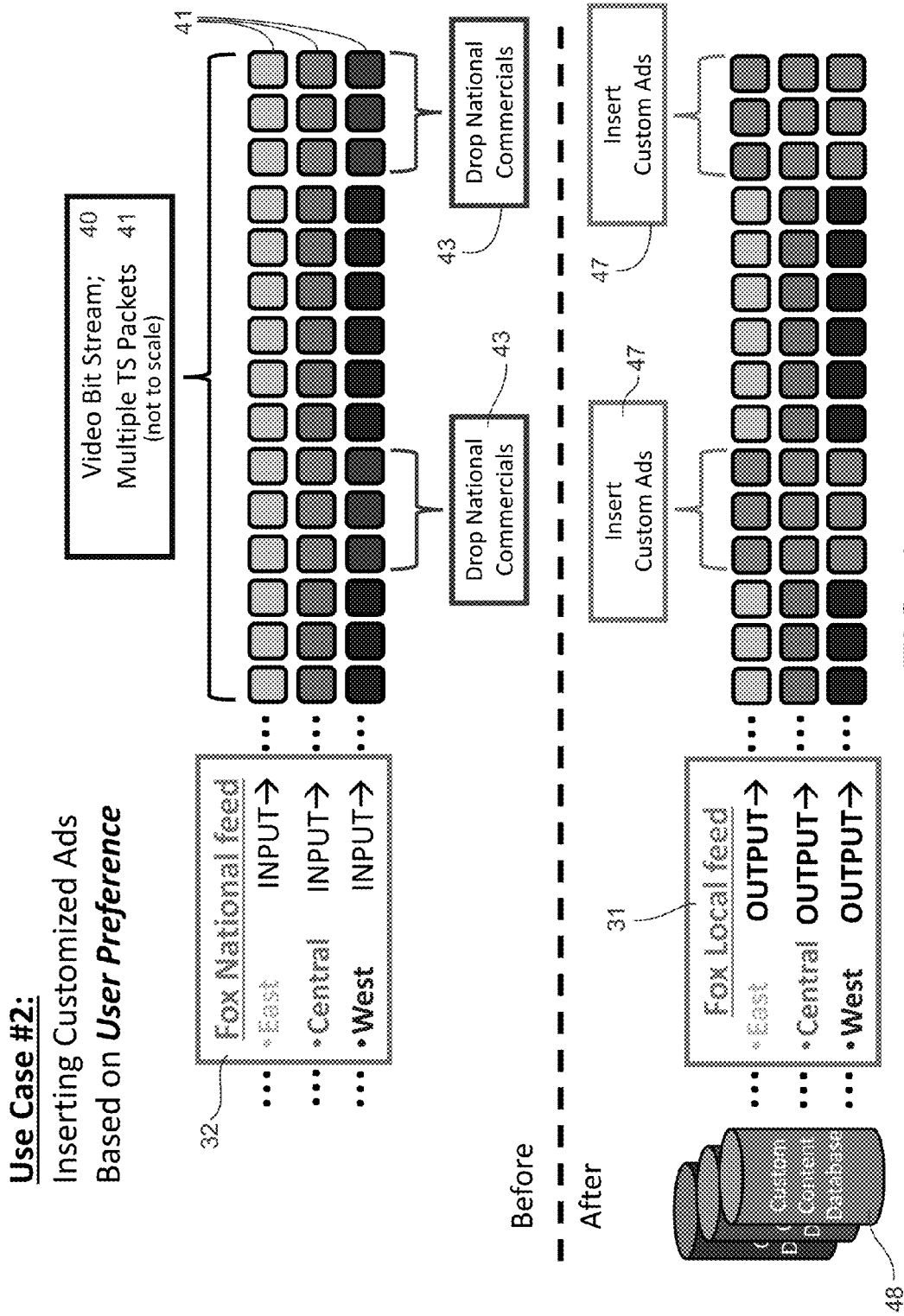

Patent Addition
Playing encrypted media on multiple software platforms & device types A Method and Procedure for *Playing Encrypted Live Streaming Video* on Browser based Devices for BOTH cases as shown below:

Therefore ensuring secure interoperability with all devices that play video over HTML5

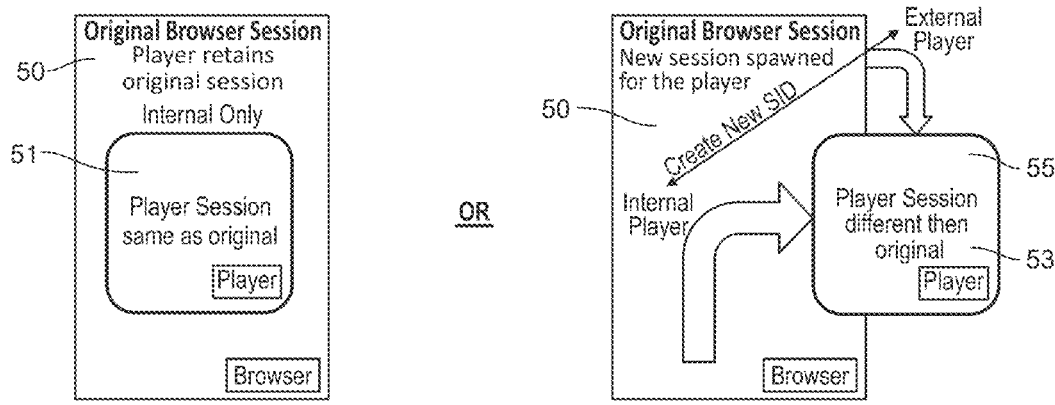

Case-1: OriginalSID == PlayerSID

Video Player "*exists*" inside the Original Browser Session

Case-2: OriginalSID != PlayerSID

Video Player "*exists*" outside the Original Browser Session; Either as an External Player App that behaves like an external Player that requires a new Session, just the same as an external player

FIG. 9

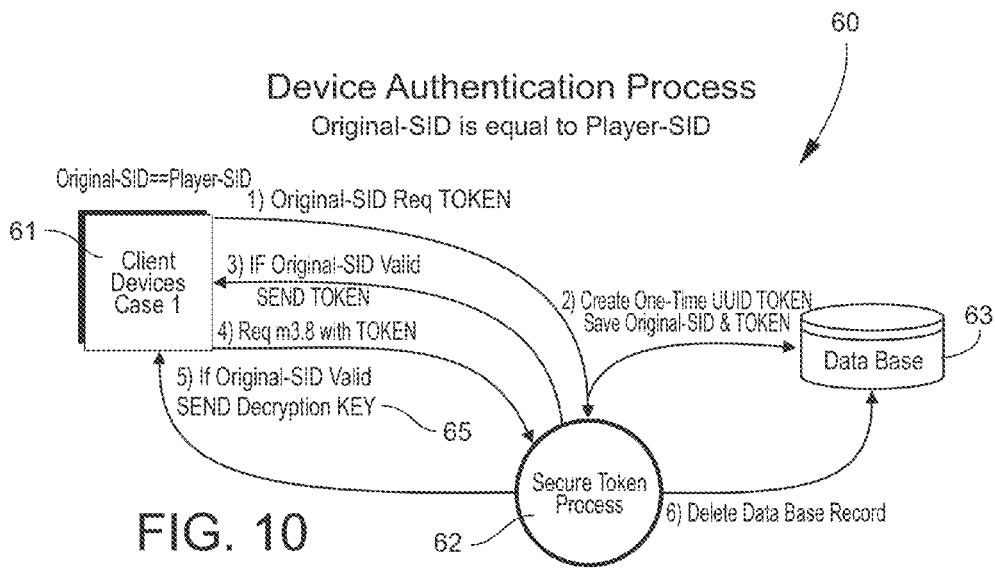

FIG. 10

Past / Future Cloud-DVR System Diagram

M3U8 Segmentation (TS File Segmentation) Method

Secure Token Process

USER @Original-SID Requests for TOKEN
    IF Original-SID is authenticated
        Generate UUID based TOKEN
        Save Original-SID & TOKEN to Data-Base Record (SESSION-x-TOKEN)
        Respond to Original-SID (Browser) with the newly created TOKEN USER @Player-SID with TOKEN Requests for m3u8 (Media Stream)
    IF Player-SID is Authenticated         Case-1: Original-SID == PlayerSID
        Respond to Player-SID with m3u8
    ELSE
        IF TOKEN is valid *(1)
            GET the Original-SID associated with that TOKEN
            IF Original-SID is not Null         Case-2: Original-SID != Player-SID
                SAVE Player-SID in DB Record with Original-SID & TOKEN
                Respond to Player-SID with m3u8

USER @Player-SID Requests for Decryption-KEY
    IF Player-SID is Authenticated         Case-1: Original-SID == Player-SID
        Respond with the KEY
    ELSE
        IF Player-SID is valid
            IF Original-SID is not Null         Case-2: Original-SID != Player-SID
                Respond with KEY
                Delete record with Original-SID

DB Structure: Session-x-TOKEN → | Original-SID | TOKEN | Player-SID |

FIG. 22

*(1) select SESSION_ID from SESSION-x-TOKEN where TOKEN= token and PLAYER_SID is null or PLAYER_SID = Player-SID

LIVE STREAMING-TV CONTENT, ACQUISITION, TRANSFORMATION, ENCRYPTION, AND DISTRIBUTION SYSTEM, AND METHOD FOR ITS USE

RELATED CASES

This application claims the priority of the provisional application Ser. No. 62/031,229 filed Jul. 31, 2014. Applicant hereby incorporates by reference the entire content of provisional application Ser. No. 62/031,229.

FIELD OF THE INVENTION

The instant invention is directed towards audio, video file segmentation, and bandwidth conservation.

BACKGROUND OF THE INVENTION

The general consensus is that before too long a major portion of one's life will run through the Internet as more and more people are connected to the grid. This realty is driven worldwide by a growing desire for enriched content and connectivity. Today's informed consumer demands content freedom and the ability to choose their preferred media without the packaging constraints of big cable.

Cloud based video streaming is not a new concept. The technical ability to deliver the streamed product is well developed and in use today all around the world. YouTube is one of the most recognizable providers in the world. Other prominent companies also in the business of video streaming of movies, stored pictures and some live simulcasting of TV programs via the Internet are all the major Networks, Apple TV, Hulu, Netflix, Angel TV, as well as most of the Cable and telephone companies. The ability to live stream hundreds of channels in high definition at low bandwidth to a vast multitude of customers has so far not been achieved by any company domestically or internationally. The main reason for this bottleneck is that present technology requires an enormous amount of computer resources and Internet bandwidth to offer live streaming of TV programs to an unlimited number of potential purchasers making this proposition cost ineffective.

Therefore, there is clearly a need for a technology that shrinks the bandwidth requirement to manageable proportions such that the company is able to live stream high definition TV to anyone on the planet who is registered as a subscriber and who has access to the Internet either by wireless or hard wire with a minimum of 3-5 MB Internet speed or 4G or LTE device. The instant invention is designed to address at least some of the above the mentioned problems.

SUMMARY OF THE INVENTION

A system for delivering audio and video to one or more users comprising a video/audio receiver, an encoder process/encoder machine operationally associated with the video/audio receiver, an UPLOADer Process/machine operationally associated with the encoder process/encoder machine, a Content Delivery Network (CDN) operationally associated with the UPLOADer Process/ machine and one or more client/subscriber machines operationally associated with the CDN.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 8 is an illustration of the removal and insertion of content into a Video Bit Stream in the present invention. Disbursement FIG. 9 is an illustration of playing encrypted media on multiple software platforms and device types in the present invention.

FIG. 10 is an illustration of a Device Authentication Process in the present invention.

FIG. 22 is an illustration of a Secure Token Process according to the present invention.

DETAILED DESCRIPTION OF THE INVENTION

Figure 1:
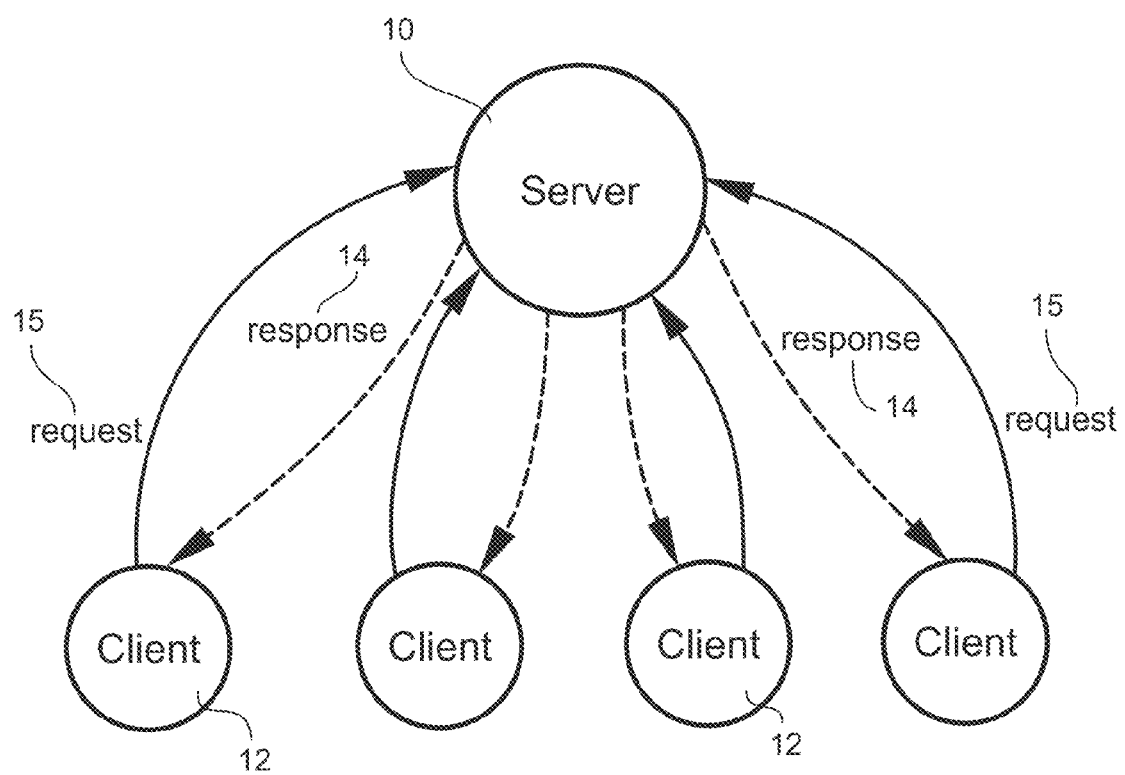
FIG. 1 is a diagram illustrating a Client/Server model in the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The Internet is a global system of interconnected computer networks that use the standard Internet protocol suite (TCP/IP) to link several billion devices worldwide. It is an international network of networks that consists of millions of private, public, academic, business, and government packet switched networks, linked by a broad array of electronic, wireless, and optical networking technologies. The Internet carries an extensive range of information resources and services, such as the interlinked hypertext documents and applications of the World Wide Web (WWW), the infrastructure to support email, and peer-to-peer networks for file sharing and telephony.

A content delivery network or content distribution network (CDN) is a large distributed system of servers deployed in multiple data centers across the Internet. The goal of a CDN is to serve content to end-users with high availability. High performance CDNs serve a large fraction of the Internet content today, including web objects (text, graphics and scripts), downloadable objects (media files, software, documents), applications (e-commerce, portals), live streaming media, on-demand streaming media, and social networks.

Content providers such as media companies and e-commerce vendors pay CDN operators to deliver their content to their audience of end-users. In turn, a CDN pays ISPs, carriers, and network operators for hosting its servers in their data centers. Besides better performance and availability, CDNs also offload the traffic served directly from the content provider's origin infrastructure, resulting in possible cost savings for the content provider. In addition, CDNs provide the content provider a degree of protection from denial of service attacks by using their large distributed server infrastructure to absorb the attack traffic. While most early CDNs served content using dedicated servers owned and operated by the CDN, there is a recent trend to use a hybrid model that uses P2P technology. In the hybrid model, content is served using both dedicated servers and other peer-user-owned computers as applicable.

Advanced Encryption Standard (AES):

AES is a specification for the encryption of electronic data established by the U.S. National Institute of Standards and Technology (NIST) in 2001. AES is based on the Rijndael cipher[s] developed by two Belgian cryptographers, Joan Daemen and Vincent Rijmen, who submitted a proposal to NIST during the AES selection process. Rijndael is a family of ciphers with different key and block sizes. For AES, the NIST selected three members of the Rijndael family, each with a block size of 128 bits, but three different key lengths: 128, 192 and 256 bits. AES has been adopted by the U.S. government and is now used worldwide. It supersedes the Data Encryption Standard (DES), which was published in 1977. The algorithm described by AES is a symmetric-key algorithm, meaning the same key is used for both encrypting and decrypting the data.

In the United States, AES was announced by the NIST as U.S. FIPS PUB 197 (FIPS 197) on Nov. 26, 2001. This announcement followed a five-year standardization process in which fifteen competing designs were presented and evaluated, before the Rijndael cipher was selected as the most suitable (see Advanced Encryption Standard process for more details). AES became effective as a federal government standard on May 26, 2002 after approval by the Secretary of Commerce. AES is included in the ISO/IEC 18033-3 standard. AES is available in many different encryption packages, and is the first publicly accessible and open cipher approved by the National Security Agency (NSA) for top secret information when used in an NSA approved cryptographic module (see Security of AES, below).

Authentication, Authorization and Accounting (AAA):

In computer security, AAA commonly stands for authentication, authorization and accounting. It refers to a security architecture for distributed systems for controlling which users are allowed access to which services, and tracking which resources they have used. Two network protocols providing this functionality are particularly popular: the RADIUS protocol, and its newer Diameter counterpart.

Authentication: refers to the process where an entity's identity is authenticated, typically by providing evidence that it holds a specific digital identity such as an identifier and the corresponding credentials. Examples of types of credentials are passwords, one-time tokens, digital certificates, digital signatures and phone numbers (calling/called).

Authorization: The authorization function determines whether a particular entity is authorized to perform a given activity, typically inherited from authentication when logging on to an application or service. Authorization may be determined based on a range of restrictions; for example, time-of-day restrictions, or physical location restrictions, or restrictions against multiple access by the same entity or user. Typical authorization in everyday computer life is, for example, granting read access to a specific file for a specific authenticated user. Examples of types of service include, but are not limited to: ip address filtering, address assignment, route assignment, quality of Service/differential services, bandwidth control/traffic management, compulsory tunneling to a specific endpoint, and encryption.

Accounting: refers to the tracking of network resource consumption by users for the purpose of capacity and trend analysis, cost allocation, billing. In addition, it may record events such as authentication and authorization failures, and include auditing functionality, which permits verifying the correctness of procedures carried out based on accounting data. Real-time accounting refers to accounting information that is delivered concurrently with the consumption of the resources. Batch accounting refers to accounting information that is saved until it is delivered at a later time. Typical information that is gathered in accounting is the identity of the user or other entity, the nature of the service delivered, when the service began, and when it ended, and if there is a status to report.

Automated Teller Machine (ATM):

An automated teller machine or automatic teller machine (ATM) also known as an automated banking machine, cash machine, or cashpoint is an electronic telecommunications device that enables the customers of a financial institution to perform financial transactions without the need for a human cashier, clerk or bank teller. In addition to methods employed for transaction security and secrecy, all communications traffic between the ATM and the Transaction Processor may also be encrypted via methods such as TLS (transport layer security). In most modern ATM systems, inserting a plastic ATM-card with a magnetic stripe, or a plastic smart card with an electronic chip that contains a unique card ID number identifies the banking client. The card contains security information such as an expiration date and personal information. Client authentication is provided by entering a personal identification number (PIN).

Brute-Force Attack:

In cryptography, a brute-force attack, or exhaustive key search, is a cryptanalytic attack that can, in theory, be used against any encrypted data (except for data encrypted in an information-theoretically secure manner). Such an attack might be utilized when it is not possible to take advantage of other weaknesses in an encryption system (if any exist) that would make the task easier. It consists of systematically checking all possible keys or passwords until the correct one is found. In the worst case, this would involve traversing the entire search space. When password guessing, this method is very fast when used to check all short passwords, but for longer passwords other methods such as the dictionary attack are used because of the time a brute-force search takes. When key guessing, the key length used in the cipher determines the practical feasibility of performing a brute-force attack, with longer keys exponentially more difficult to crack than shorter ones. A cipher with a key length of N bits can be broken in a worst-case time proportional to 2N and an average time of half that. Brute-force attacks can be made less effective by obfuscating the data to be encoded, something that makes it more difficult for an attacker to recognize when he/she has cracked the code. One of the measures of the strength of an encryption system is how long it would theoretically take an attacker to mount a successful brute-force attack against it. In cryptography, a brute-force attack, or exhaustive key search, is a cryptanalytic attack that can, in theory, be used against any encrypted data (except for data encrypted in an information-theoretically secure manner). Such an attack might be utilized when it is not possible to take advantage of other weaknesses in an encryption system (if any exist) that would make the task easier. It consists of systematically checking all possible keys or passwords until the correct one is found. In the worst case, this would involve traversing the entire search space.

Cable Television Head-End (CTHE):

A cable television head-end is a master facility for receiving television signals for processing and distribution over a cable television system. The head-end facility is normally unstaffed and surrounded by some type of security fencing and is typically a building or large shed housing electronic equipment used to receive and re-transmit video over the local cable infrastructure. One can also find head ends in power line communication (PLC) substations and Internet communications networks.

Client-Server Model:

Networks in which certain computers have special dedicated tasks, providing services to other computers (in the network) are called client-server networks. The client-server model of computing is a distributed application structure that partitions tasks or workloads between the providers of a resource or service, called servers, and service requesters, called clients. Often clients and servers communicate over a computer network on separate hardware, but both client and server may reside in the same system.

A server host runs one or more server programs, which share their resources with clients. A client does not share any of its resources, but requests a server's content or service function. Clients therefore initiate communication sessions with servers, which await incoming requests. Examples of computer applications that use the client-server model are Email, network printing, and the World Wide Web (see FIG. 1).

Data Encryption Standard (DES):

DES is a previously predominant symmetric-key algorithm for the encryption of electronic data. It was highly influential in the advancement of modern cryptography in the academic world. Developed in the early 1970s, the algorithm was submitted to the National Bureau of Standards (NBS) following the agency's invitation to propose a candidate for the protection of sensitive, unclassified electronic government data. In 1976, after consultation with the National Security Agency (NSA), the NBS eventually selected a slightly modified version, which was published as an official Federal Information Processing Standard (FIPS) for the United States in 1977. The publication of an NSA-approved encryption standard simultaneously resulted in its quick international adoption and widespread academic scrutiny. Controversies arose out of classified design elements, a relatively short key length of the symmetric-key block cipher design, and the involvement of the NSA, nourishing suspicions about a backdoor. The intense academic scrutiny the algorithm received over time led to the modern understanding of block ciphers and their cryptanalysis.

DES is now considered to be insecure for many applications. This is chiefly due to the 56-bit key size being too small; in January, 1999, distributed.net and the Electronic Frontier Foundation collaborated to publicly break a DES key in 22 hours and 15 minutes. There are also some analytical results which demonstrate theoretical weaknesses in the cipher, although they are infeasible to mount in practice. The algorithm is believed to be practically secure in the form of Triple DES, although there are theoretical attacks. In recent years, the cipher has been superseded by the Advanced Encryption Standard (AES). Furthermore, DES has been withdrawn as a standard by the National Institute of Standards and Technology (formerly the National Bureau of Standards).

Encryption AES 128-bit:

A 128-bit symmetric key is computationally secure against brute-force attack. Just consider the following:

For example, the world's fastest supercomputer (per Wikipedia): 10.51 PetaFlops=10.51×1015 Flops [Flops=Floating point operatior second]

Number of Flops required per combination check: 1000 (very opti but just assume for now)

Number of combination checks per second=(10.51× 1015)/1000×10.51×1012

Number of seconds in one Year=365×24×60×60=31536000

Number of Years to crack AES with 128-bit Key
=(3.4×1038)/[10.51×1012)×31536000]
=(0.323×1026)/31536000
=1.02×1018
=1 billion*billion years

TABLE 1

Time to crack Cryptographic Key versus Key size

| Key size | Time to Crack |
|---|---|
| 56-bit | 399 seconds |
| 128-bit | $1.02 \times 10^{18}$ years |
| 192-bit | $1.872 \times 10^{37}$ years |
| 256-bit | $3.31 \times 10^{56}$ years |

As shown above, even with a supercomputer, it would take 1 billion-billion years to crack the 128-bit AES key using brute force attack. This is more than the age of the universe (13.75 billion years). If one were to assume that a computing system existed that could recover a DES key in a second, it would still take that same machine approximately 149 trillion years to crack a 128-bit AES key There are more interesting examples. The following snippet is a snapshot of one the technical papers from Seagate titled "128-bit versus 256-bit AES encryption" to explain why 128-bit AES is sufficient to meet future needs.

If you assume:
Every person on the planet owns 10 computers.
There are 7 billion people on the planet.
Each of these computers can test 1 billion key combinations per second.
On average, you can crack the key after testing 50% of the possibilities.
Then the earth's population can crack one encryption key in 77,000,000,000,000,000,000,000,000 years!

The bottom line is that if AES could be compromised, the world would come to a standstill. The difference between cracking the AES-128 algorithm and AES-256 algorithm is considered minimal. Whatever breakthrough might crack 128-bit will probably also crack 256-bit.

In the end, AES has never been cracked yet and is safe against any brute force attacks contrary to belief and arguments. However, the key size used for encryption should always be large enough that it could not be cracked by modern computers despite considering advancements in processor speeds based on Moore's law.

Hypertext Transfer Protocol (HTTP):

HTTP is an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext. HTTP functions as a request-response protocol in the client-server computing model. A web browser, for example, may be the client and an application running on a computer hosting a web site may be the server. The client submits an HTTP request message to the server. The server, which provides resources such as HTML files and other content, or performs other functions on behalf of the client, returns a response message to the client. The response contains completion status information about the request and may also contain requested content in its message body.

Hypertext Transfer Protocol Secure (HTTPS):

Hypertext Transfer Protocol Secure (HTTPS) is a communications protocol for secure communication over a computer network, with especially wide deployment on the Internet. Technically, it is not a protocol in and of itself; rather, it is the result of simply layering the Hypertext Transfer Protocol (HTTP) on top of the SSL/TLS protocol, thus adding the security capabilities of SSL/TLS to standard HTTP communications. The main motivation for HTTPS is to prevent wiretapping and man-in-the-middle attacks. The security of HTTPS is therefore that of the underlying TLS, which uses long term public and secret keys to exchange a short term session key to encrypt the data flow between client and server. An important property in this context is perfect forward secrecy (PFS), so the short-term session key cannot be derived from the long-term asymmetric secret key; however, PFS is not widely adopted.

National Institute of Standards and Technology (NIST):

NIST, also known between 1901 and 1988 as the National Bureau of Standards (NBS), is a measurement standards laboratory, also known as a National Metrological Institute (NMI), which is a non-regulatory agency of the United States Department of Commerce. The institute's official mission is to: Promote U.S. innovation and industrial competitiveness by advancing measurement science, standards, and technology in ways that enhance economic security and improve our quality of life.

NIST had an operating budget for fiscal year 2007 (Oct. 1, 2006-Sep. 30, 2007) of about $843.3 million. NIST's 2009 budget was $992 million, and it also received $610 million as part of the American Recovery and Reinvestment Act. NIST employs about 2,900 scientists, engineers, technicians, and support and administrative personnel. About 1,800 NIST associates (guest researchers and engineers from American companies and foreign countries) complement the staff. In addition, NIST partners with 1,400 manufacturing specialists and staff at nearly 350 affiliated centers around the country. NIST publishes the Handbook 44 that provides the "Specifications, tolerances, and other technical requirements for weighing and measuring devices".

Over-the-top Content (OTT):

OTT refers to delivery of video, audio and other media over the Internet without a multiple system operator being involved in the control or distribution of the content. The provider may be aware of the contents of the Internet Protocol packets but is not responsible for, nor able to control, the viewing abilities, copyrights, and/or other redistribution of the content. This is in contrast to purchase or rental of video or audio content from an Internet service provider (ISP), such as pay television video on demand or an IPTV video service, like AT&T U-Verse. OTT in particular refers to content that arrives from a third party, such as NowTV, Netflix, WhereverTV, NetD, Hulu, Crackle, WWE Network, RPI TV or myTV, and is delivered to an end user device, leaving the ISP responsible only for transporting IP packets. Over-the-top messaging refers to a similar idea, where a third party provides instant messaging services as an alternative to text messaging services provided by a mobile network operator. Consumers can access OTT content through internet-connected devices such as desktop and laptop computers, tablets, smartphones including iPhones and Android phones, set-top boxes such as the Roku and Google TV, smart TVs and gaming consoles such as the Wii, PlayStation 3 and Xbox 360. Consumers can access apps in most app stores.

RS-232 Serial Data Communications Standard:

In telecommunications, RS-232 is a standard for serial communication transmission of data. It formally defines the signals connecting between a DTE (data terminal equipment) such as a computer terminal, and a DCE (data circuit-terminating equipment, originally defined as data communication equipment), such as a modem. The RS-232 standard is commonly used in computer serial ports. The standard defines the electrical characteristics and timing of signals, the meaning of signals, and the physical size and pinout of connectors. The current version of the standard is TIA-232-F Interface Between Data Terminal Equipment and Data Circuit-Terminating Equipment Employing Serial Binary Data Interchange, issued in 1997.

Secret Key Cryptography (SKC):

SKE uses a single key to both encrypt and decrypt messages. As such it must be present at both the source and destination of transmission to allow the message to be transmitted securely and recovered upon receipt at the correct destination. The key must be kept secret by all parties involved in the communication. If the key fell into the hands of an attacker, they would then be able to intercept and decrypt messages, thus thwarting the attempt to attain secure communications by this method of encryption. Secret key algorithms like DES assert that even although it is theoretically possible to derive the secret key from the encrypted message alone, the quantities of computation involved in doing so make any attempts infeasible with current computing hardware.

Secure Socket Tunneling Protocol (SSTP):

SSTP is a new tunneling protocol that uses the HTTPS protocol over TCP port 443 to pass traffic through firewalls and Web proxies that might block PPTP and L2TP/IPsec traffic. SSTP provides a mechanism to encapsulate PPP (point-to-point protocol) traffic over the Secure Sockets Layer (SSL) channel of the HTTPS protocol. The use of PPP allows support for strong authentication methods, such as EAP-TLS. SSL provides transport-level security with enhanced key negotiation, encryption, and integrity checking. When a client tries to establish a SSTP-based VPN connection, SSTP first establishes a bidirectional HTTPS layer with the SSTP server. Over this HTTPS layer, the protocol packets flow as the data payload. Encapsulation: SSTP encapsulates PPP frames in IP datagrams for transmission over the network. SSTP uses a TCP connection (over port 443) for tunnel management as well as PPP data frames. Encryption: The SSTP message is encrypted with the SSL channel of the HTTPS protocol.

Set-top-box (STB):

An STB is an information appliance device that generally contains a TV-tuner input and displays output connects to a television set and an external source of signal, turning the source signal into content in a form that can then be displayed on the television screen or other display device. They are used in cable television, satellite television, and over-the-air television systems, as well as other uses.

Socket.IO:

Socket.IO is a JavaScript library for real-time web applications. It has two parts: a client-side library that runs in the browser, and a server-side library for node.js. Both components have a nearly identical API. Like node.js, it is event-driven. Socket.IO primarily uses the Web Socket protocol, but if needed can fall back on multiple other methods, such as Adobe Flash sockets, JSONP polling, and AJAX long polling, while providing the same interface. Although it can be used as simply a wrapper for Web Socket, it provides many more features, including broadcasting to multiple sockets, storing data associated with each client, and asynchronous I/O. It can be installed with the npm (node packaged modules) tool.

Transmission Control Protocol (TCP):

Transmission Control Protocol (TCP) is one of the core protocols of the Internet protocol suite (IP), and is so common that the entire suite is often called TCP/IP. TCP provides reliable, ordered and error-checked delivery of a stream of octets between programs running on computers connected to a local area network, intranet or the public Internet. It resides at the transport layer.

Transport Layer Security (TLS):

TLS and its predecessor, Secure Sockets Layer (SSL), are cryptographic protocols, which are designed to provide communication security over the Internet. They use X.509 certificates and hence asymmetric cryptography to assure the counterparty with whom they are communicating, and to exchange a symmetric key. This session key is then used to encrypt data flowing between the parties. This allows for data/message confidentiality, and message authentication codes for message integrity and as a by-product, message authentication. Several versions of the protocols are in widespread use in applications such as web browsing, electronic mail, Internet faxing, instant messaging, and voice-over-IP (VoIP). An important property in this context is forward secrecy, so the short-term session key cannot be derived from the long-term asymmetric secret key.

In the Internet Protocol Suite, TLS and SSL encrypt the data of network connections in the application layer. In OSI model equivalences, TLS/SSL is initialized at layer 5 (session layer) and works at layer 6 (the presentation layer). The session layer has a handshake using an asymmetric cipher in order to establish cipher settings and a shared key for that session; then the presentation layer encrypts the rest of the communication using a symmetric cipher and that session key. In both models, TLS and SSL work on behalf of the underlying transport layer, whose segments are provisioned to carry the encrypted data.

Web Socket (WS):

WS is a protocol providing full-duplex communications channels over a single TCP connection. The Web Socket protocol was standardized by the IETF as RFC 6455 in 2011, and the Web Socket API in Web IDL is being standardized by the W3C. A Web Socket is designed to be implemented in web browsers and web servers, but it can be used by any client or server application. The Web Socket Protocol is an independent TCP-based protocol. Its only relationship to HTTP is that its handshake is interpreted by HTTP servers as an Upgrade request. The Web Socket protocol makes possible more interaction between a browser and a web site, facilitating live content and the creation of real-time games. This is made possible by providing a standardized way for the server to send content to the browser without being solicited by the client, and allowing for messages to be passed back and forth while keeping the connection open. In this way a two-way (bi-directional) ongoing conversation can take place between a browser and the server.

WS-security (WSS):

WSS incorporates security features in the header of a SOAP message, working in the application layer. These mechanisms by themselves do not provide a complete security solution for Web services. Instead, this specification is a building block that can be used in conjunction with other Web service extensions and higher-level application-specific protocols to accommodate a wide variety of security models and security technologies. In general, WSS by itself does not provide any guarantee of security. When implementing and using the framework and syntax, it is up to the implementer to ensure that the result is not vulnerable. Key management, trust bootstrapping, federation and agreement on the technical details (ciphers, formats, and algorithms) is outside the scope of WS-Security.

The present invention may be embodied in other forms without departing from the spirit and the essential attributes thereof, and, accordingly, reference should be made to the appended claims, rather than to the foregoing specification, as indicated the scope of the invention.

Initially, during the early 1980's, Client-Server Model based applications involved mainframe computers connected to many terminals (slaves or clients) via simple serial connections, like RS-232, using open standards based data-communications protocols; connecting many clients to one server.

Automated Teller Machine Example (Client-server Model)

For example, the large banks at the time were working primarily with client/server models when designing Automated Teller Machine (ATM)—money machines or more accurately; computer client-server systems, utilizing application-designed to distribute & collect cash to & from banking clients; while managing all transactions securely.

Looking to FIG. 1, there is illustrated an embodiment showing that this design employed a technique of using simple handshaking protocols to manage the privacy and security of the entire system via an open standards based client-server data communications protocol, traversing telecommunication networks, connecting vast arrays of computer systems. Essentially, a server 10 would receive a request 15 from a client 12 for some form of data. The server 10 would then respond 14 to the request 15 by transmitting the requested data to the client 12.

Sensitive data in ATM transactions eventually evolved from being typically encrypted with the Data Encryption Standard (DES), to Triple-DES; until the early 2000's, when a new encryption algorithm was invented called Advanced Encryption Standard (AES). It has been demonstrated by the industry that AES secured encryption is adequate in the prevention of even a Brute Force Attack; therefore creating an environment for secure transactions and the transfer of sensitive data across the open Internet. This secure environment is provided via software-implemented AES algorithms for reliable and secure transfer of sensitive data. In much the same way, consumer transactions over the Internet became popular in the 1990's, creating the need to provide a secure and private way to manage credit card transactions over the World Wide Web.

In 1997, National Institute of Standards and Technology (NIST) initiated a very public, four and a half year process to develop a new secure cryptosystem for U.S. government applications and financial transactions. The result, the Advanced Encryption Standard (AES), became the official successor to DES in December 2001. AES uses a Shared Secret Key Cryptography (SKC) algorithm called Rijndael, a block cipher designed by Belgian cryptographers Joan Daemen and Vincent Rijmen. The algorithm can use a variable block length and key length; the latest specification allowed any combination of key lengths of 128, 192, or 256 bits in blocks of data. The length of each block is variable to 128, 192, or 256 bits. NIST initially selected the Rijndael AES algorithm in October 2000. Formal adoption as the AES standard came in December 2001.

Figure 2:
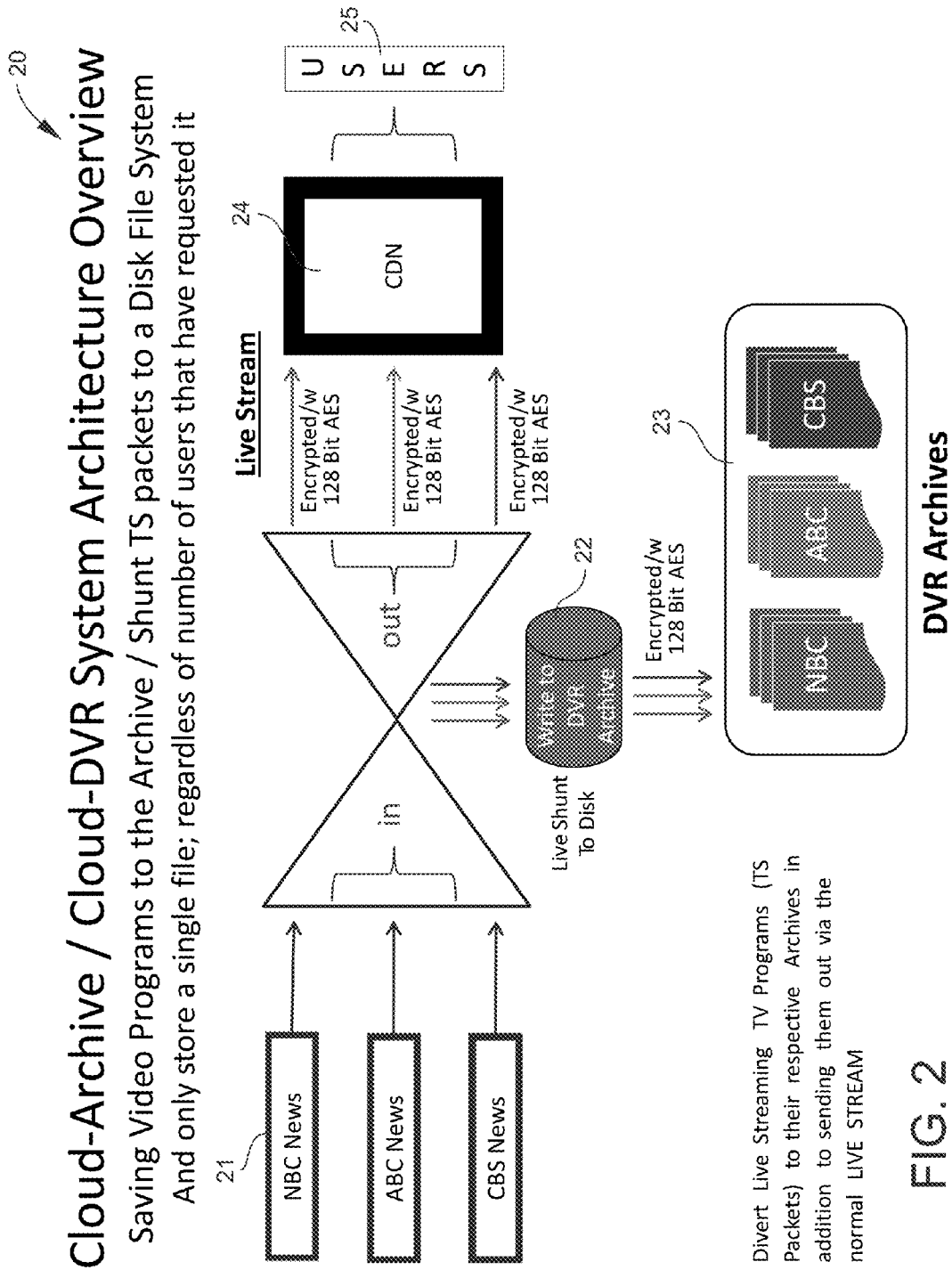
FIG. 2 is an illustration of a Cloud-Archive/Cloud-DVR System Architecture Overview in the present invention.

Looking now to FIG. 2, there is illustrated an embodiment of a Cloud-Archive/Cloud-DVR System 20. This system 20 allows a subscriber/user 25 the ability to save video program(s) 21 to a storage database 23 (archive). Put another way, the subscriber 25 can direct transport stream packets 21 to be written 22 (DVR writer) to a disk file system 23 (DVR archive). The system 20 then allows one or more subscribers the ability to live stream the saved program(s) 21 from the DVR archive 23, in an encrypted format, through the CDN 24 to the subscribers/users 25.

Figure 3:
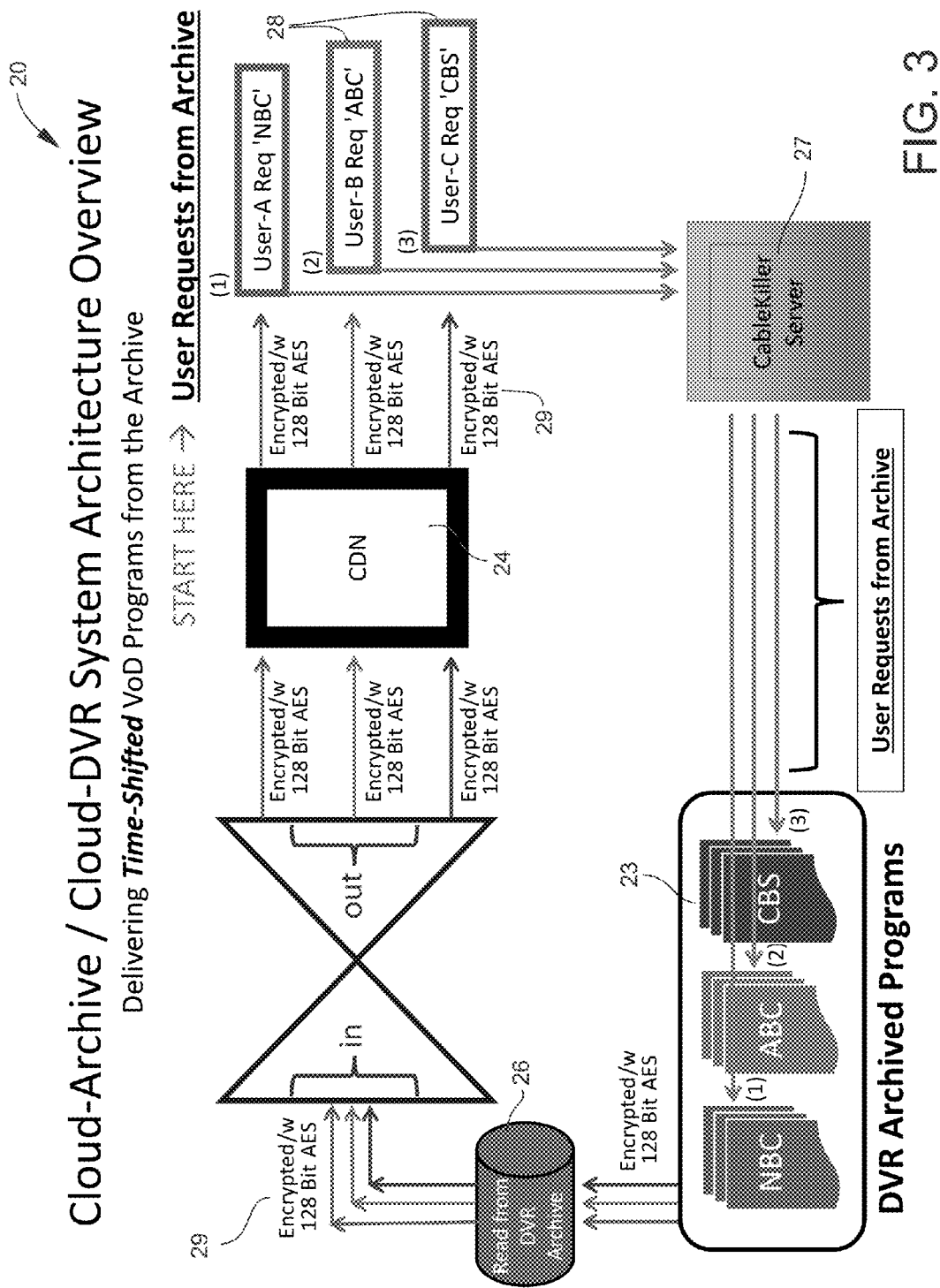
FIG. 3 is an illustration of a Cloud-Archive/Cloud-DVR System Architecture Overview in the present invention.

Looking now to FIG. 3, there is illustrated another embodiment of a Cloud-Archive/Cloud-DVR System 20 illustrating a subscriber/user 25 requesting a program 28 from a server 27 which then parses the storage archive 23 for the requested program(s) 29. When located, a DVR reader 26 then transmits to the system the requested program(s) 21, in an encrypted format, through the CDN 24 to the subscribers/users 25 where they are decrypted and viewed.

Figure 4:
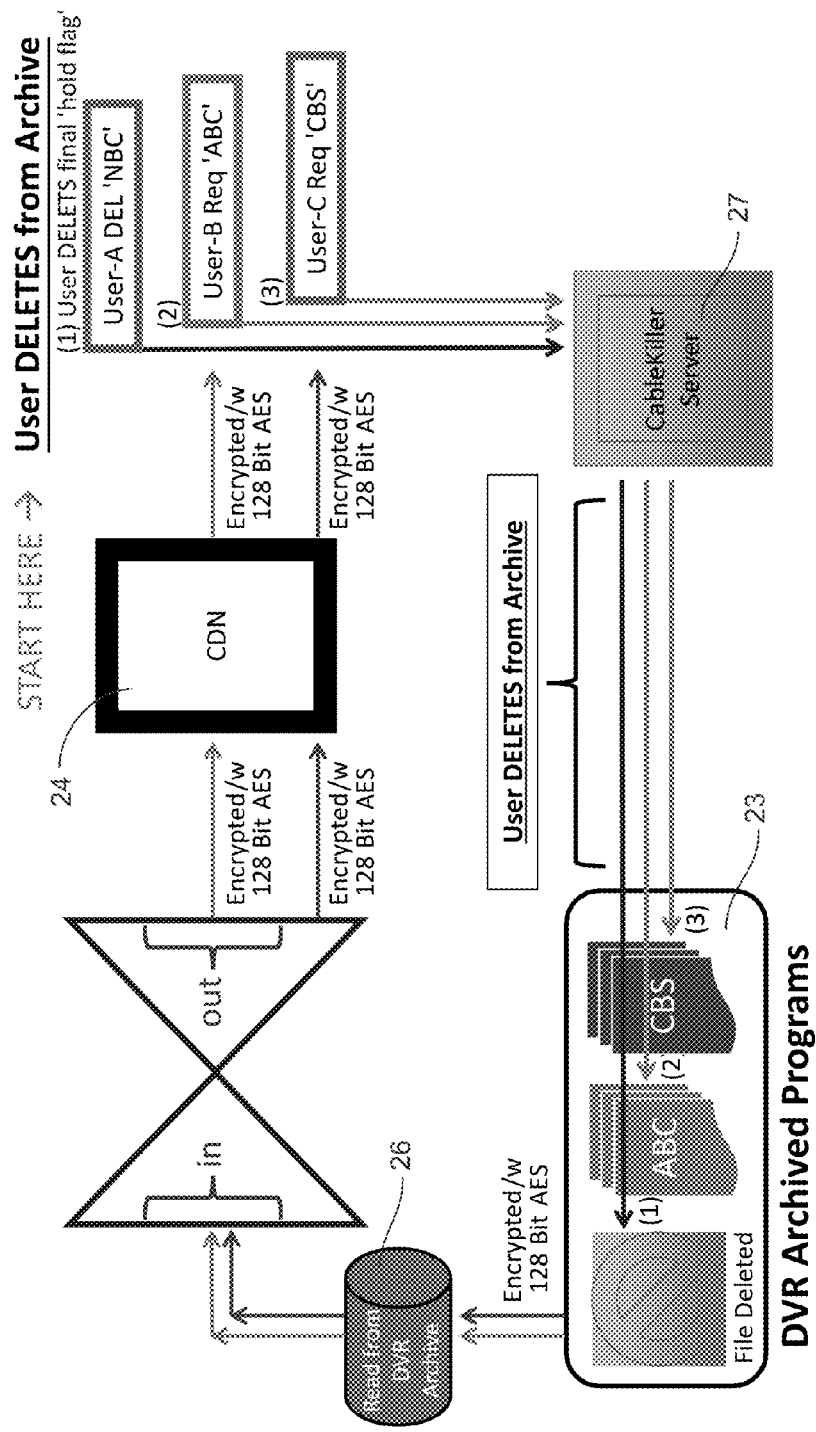
FIG. 4 is an illustration of a Cloud-Archive/Cloud-DVR System Architecture Overview in the present invention.

Looking now to FIG. 4, there is illustrated another embodiment of a Cloud-Archive/Cloud-DVR System 20 illustrating a subscriber/user 25 requesting a program 21 be deleted from a server 27 which then parses the storage archive 23 for the requested program(s) 21. When located, the program(s) 21 are deleted from the storage archive 23 and the existing recorded program(s) 21 remain accessible to the subscriber/user 25.

Figure 5:
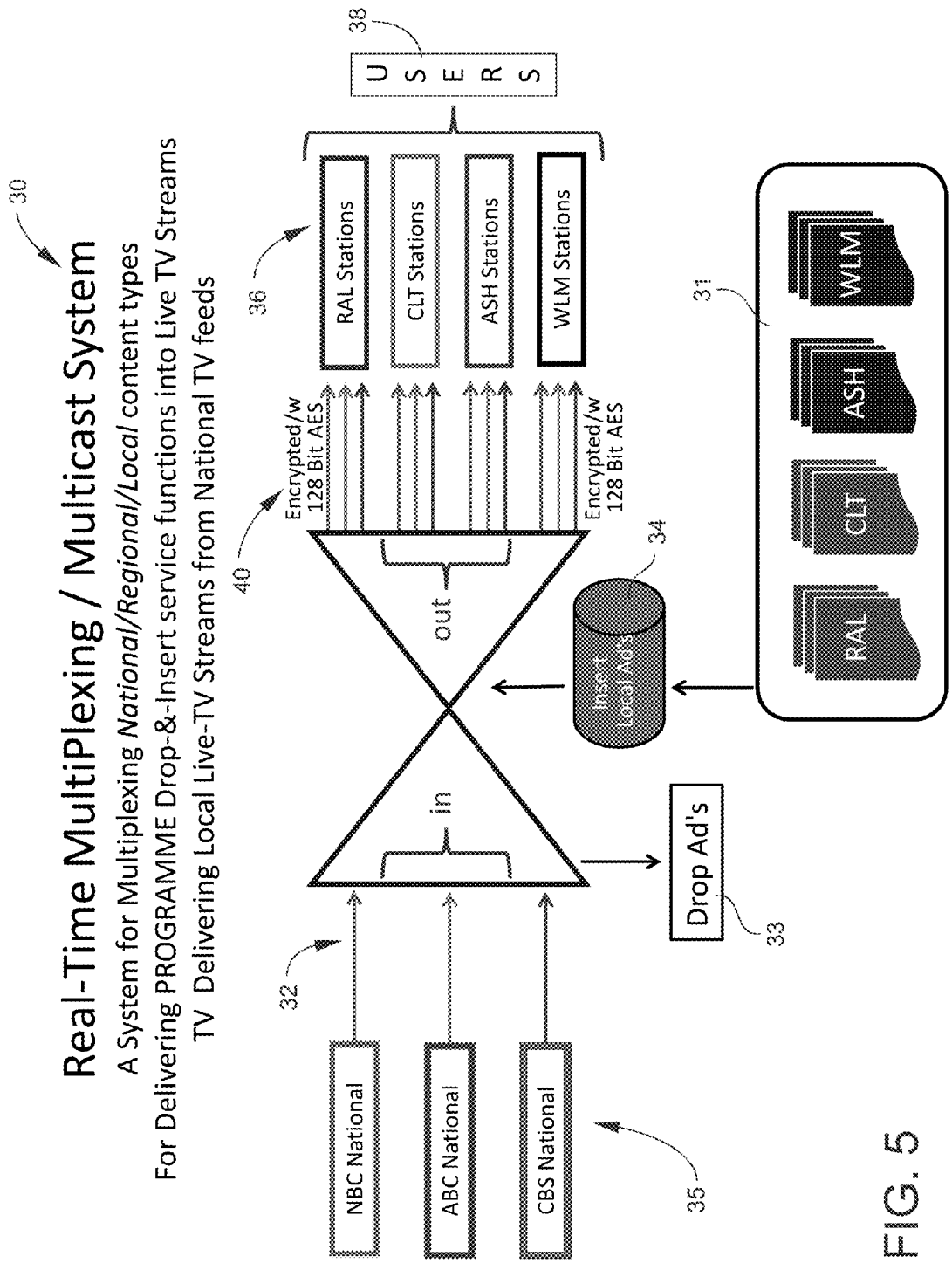
FIG. 5 is an illustration of a Real-Time Multiplexing/Multicast System in the present invention.

Looking now to FIG. 5, there is illustrated an embodiment of a real-time multiplexing/multicast system 30 which is a system for multiplexing national, regional and local content types. Essentially, the multiplexing/multicast system 30 is designed to deliver a program drop & insert service functions into live video streams. Put another way, the multiplexing/multicast system 30 delivers local live-TV streams 31 which are derived from national TV feeds 32. The instant invention allows for the removal of national TV ads 33 broadcast by national TV stations 35 and the insertion of local TV ads 34 broadcast by local TV stations 36.

Figure 6:
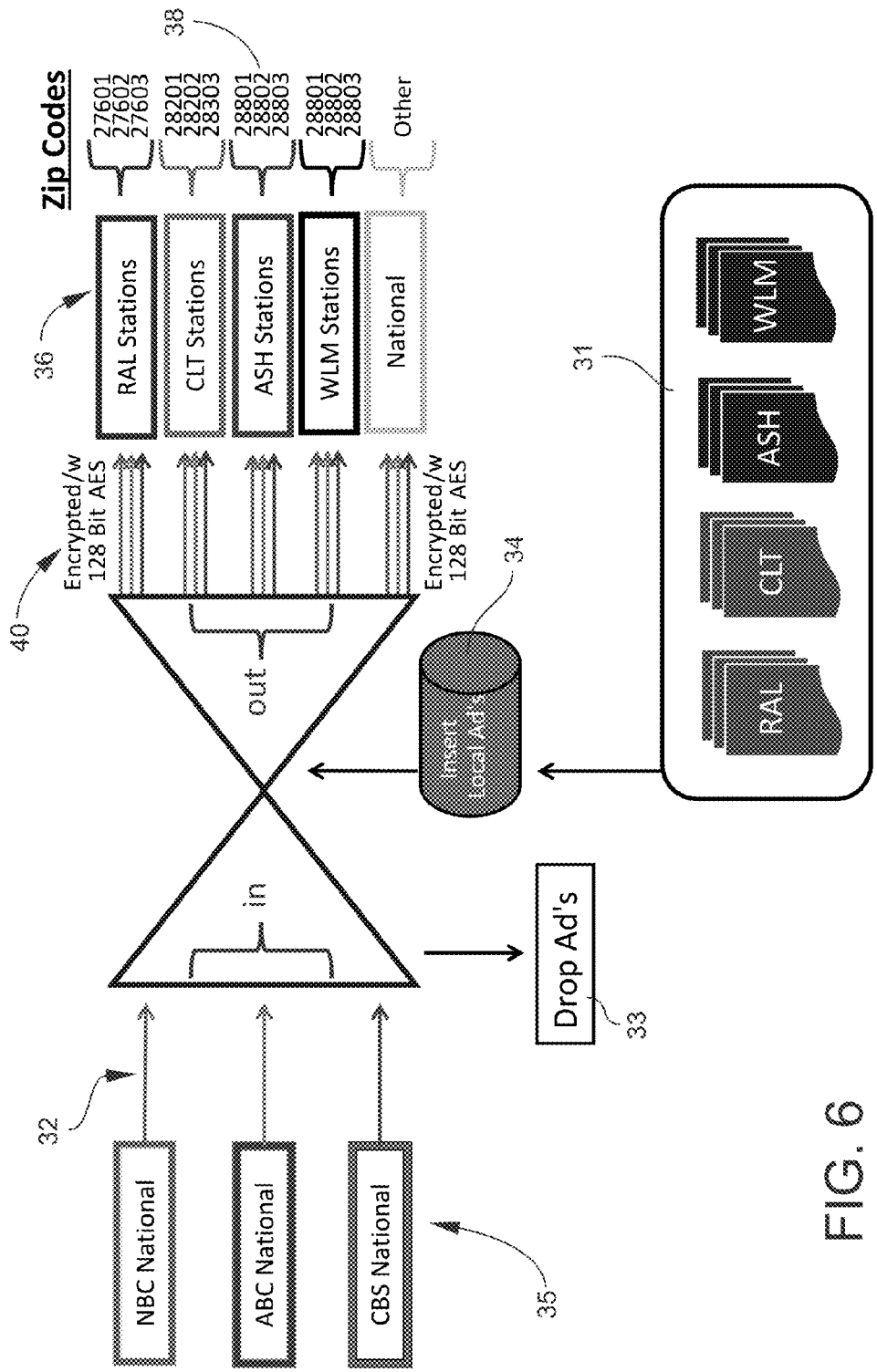
FIG. 6 is an illustration of a Real-Time Multiplexing/Multicast System in the present invention.
Figure 7:
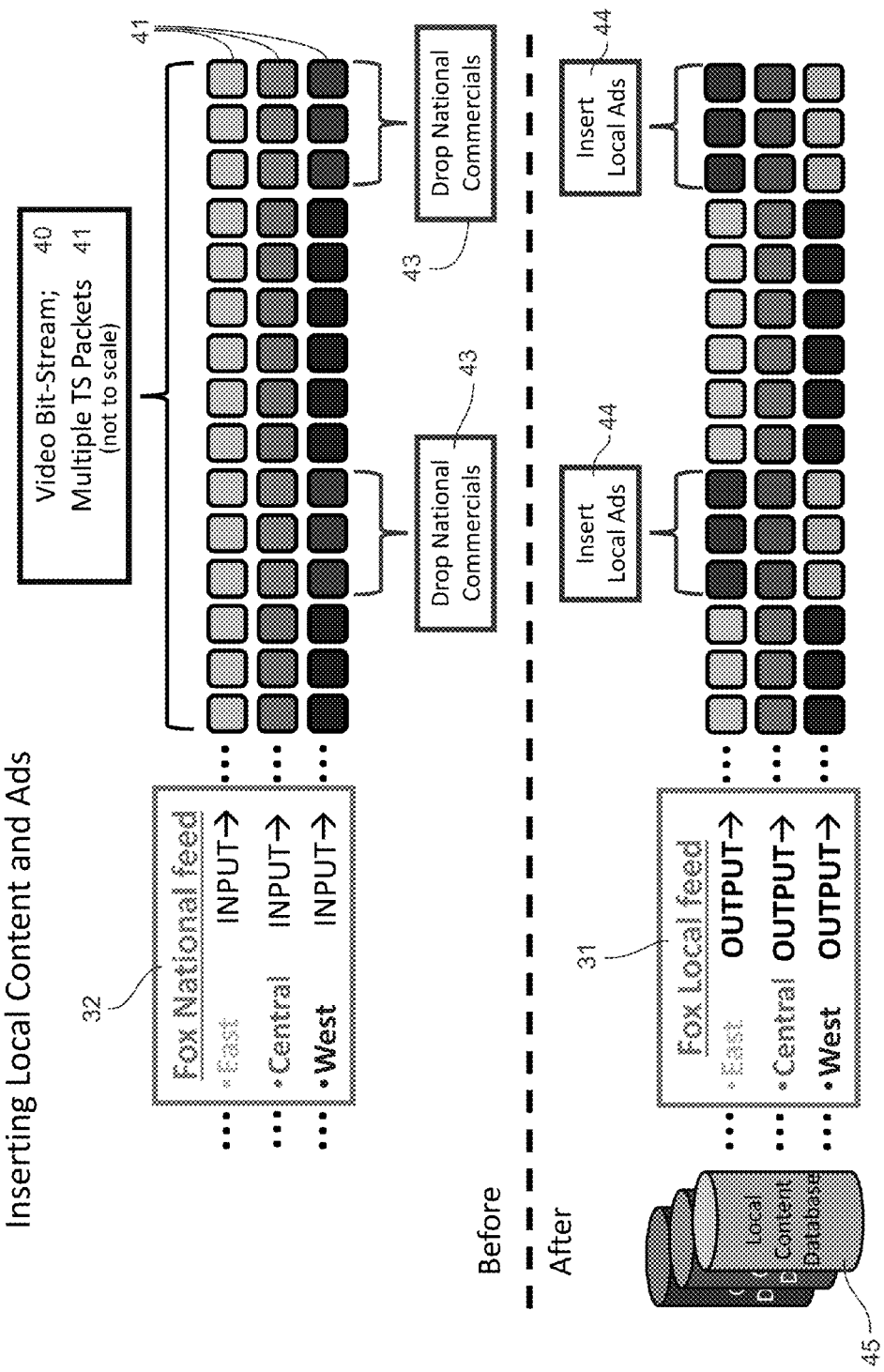
FIG. 7 is an illustration of the removal and insertion of content into a Video Bit Stream in the present invention.

Looking now to FIG. 6, there is illustrated another embodiment of a real-time multiplexing/multicast system 30 which is a system for delivering local live-TV streams derived from National TV fees. As illustrated, national TV stations 35 broadcast national TV feeds 32 which are entered into the system 30 where national TV ads 33 are removed and local TV ads 34 are then inserted by local TV stations 36 which are then broadcast out as encrypted to local TV stations and local subscribers 38. FIG. 7 illustrates one embodiment of a method for inserting local content and ads into a video stream. As illustrated, a national TV stream 32 is input into the system 30 as a video bit stream 40 containing multiple TS packets 41. The specifics TS packets 41 containing national television ads 43 are removed prior to streaming to local customers. Local television ads 44 are then inserted from a source (e.g. a local content database 45) as TS packets 41 which simply replace and/or supplement the TS packets previously removed. FIG. 8 illustrates another embodiment of a method for inserting local content and ads into a video stream based on user preference. The user preference is derived from a variety of sources including television viewing habits, spending habits, internet site viewing habits, or a combination thereof. The specifics TS packets 41 containing national television ads 43 are removed prior to streaming to local customers. Custom television ads 47 are then inserted from a source (e.g. a custom content database 48) as TS packets 41 which simply replace and/or supplement the TS packets previously removed.

Looking now to FIG. 9, there is illustrated an embodiment of a method and procedure for playing encrypted live streaming video on internet browser based devices. The method ensures the secure interoperability with all devices that a subscriber uses to play video over HTML5. A subscriber begins an original browser session 50 and then begins watching a video stream on an original video player 51. In this case, the video player 51 "exists" within the original browser session 50. As an alternative, a subscriber begins an original browser session 50 and then begins watching a video stream on a secondary video player 53 in a secondary browser session 55 which was spawned for the secondary video player 53. Looking now to FIG. 10, there is illustrated an embodiment of a device authentication process 60 in which the Original SID is equal to the Player SID. In this process 60, the original sign in device (SID) or client device 61

(1) requests a TOKEN from the SECURE TOKEN PROCESS 62, which (2) creates a one-time universally unique identifier (UUID) while saving the original SID and TOKEN and transmitting them to the database 63

(3) sends the TOKEN back to the client device 61 if the Original SID is valid (4) requests m3.8 with TOKEN (5) sends a decryption key 65 if the Original SID is valid and then (6) deletes the database record from the database 63.

Figure 11:
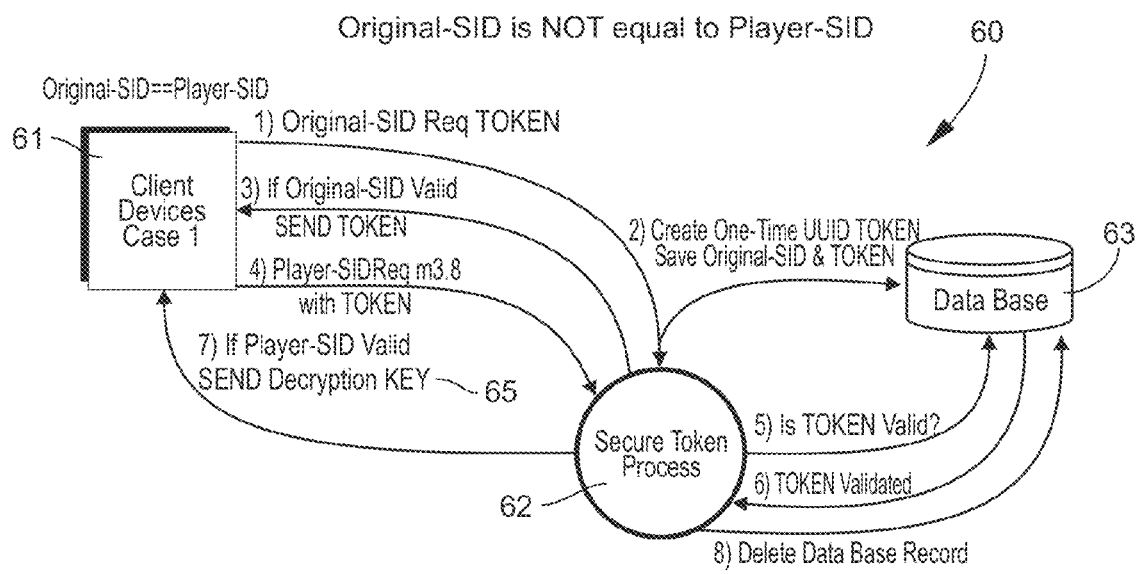
FIG. 11 is an illustration of a Device Authentication Process in the present invention.

Looking now to FIG. 11, there is illustrated an embodiment of a device authentication process 60 in which the Original SID is NOT equal to the Player SID. In this process 60, the original sign in device (SID) or client device 61

(1) requests a TOKEN from the SECURE TOKEN PROCESS 62, which (2) creates a one-time universally unique identifier (UUID) while saving the original SID and TOKEN and transmitting them to the database 63

(3) sends the TOKEN back to the client device 61 if the Original SID is valid (4) requests m3.8 with TOKEN (5) the Secure Token Process 62 then validates the TOKEN with the database 63 which then (6) validates the TOKEN (7) sends a decryption key 65 if the Player SID is valid and then (8) deletes the database record from the database 63.

STB vs. ATM

Regarding the instant invention, our premise is that if 128-bit AES Encryption is secure enough for the banking industry to manage cash transactions on a global basis, that same encryption technique will be more than adequate to secure the management of Live TV video streams. Encrypted data cannot be seen even with the most advanced analytical techniques.

A Set Top Box (STB) connected directly to Cable Television Head End (CTHE) became popular via coaxial cable (coax), but these systems were open for exploitation in several ways; they could be tapped and content could then be stolen illegally, and any channel output (Video RGB) could be easily recorded via VHS. Eventually the operators decided to send digital signals (data) to the STB, which required digital codecs to decode videos. All channels are sent to STB at same time.

OTT & OTT-STB & Cable DVR

An OTT (Over-The-Top) STB is basically a computer that receives all channel streams via IP. Oddly enough, today the majority of content providers are arguing that content can now be easily pirated within this framework;—but not with an encrypted connection between the IP-Head-End and the IP-STB or video players. The customer will be able to DVR (record) TV shows internal to the STB, in the example of the "TIVO" model. Every Cable Operator assigns a unique key to each STB that ultimately prevents the subscriber from relocating their STB, which deters theft because the STB will not be recognized or authorized to play content elsewhere.

Essentially, a cable network consists of computers working together in a client 12/server 10 model with hardware and software on each end of the network that authorizes and manages the flow of content. With the CSHE the system controls are provisioned to allow your STB to access only the content that you are duly authorized to view. This is the method that is most widely used in the industry. It consists of sending enormous amounts of digitally encoded video in such a way that all or nearly all channels are carried within a single IP broadband bit-stream or sub-streams, typically 6 Mhz channel width.

A typical OTT System relies on a network connection that uses the Internet as a wiring (as in L2TP) to communicate directly with your OTT-STB or OTT application. In this case the end user will only be allowed to view a single program and possibly record a second program at the same time. The reason for this is that there exists a bandwidth limitation in the Customer STB that prevents the simultaneous viewing/recording of more than two or three channels.

Switched Video Distribution vs. Non-switched Distribution

Figure 12:
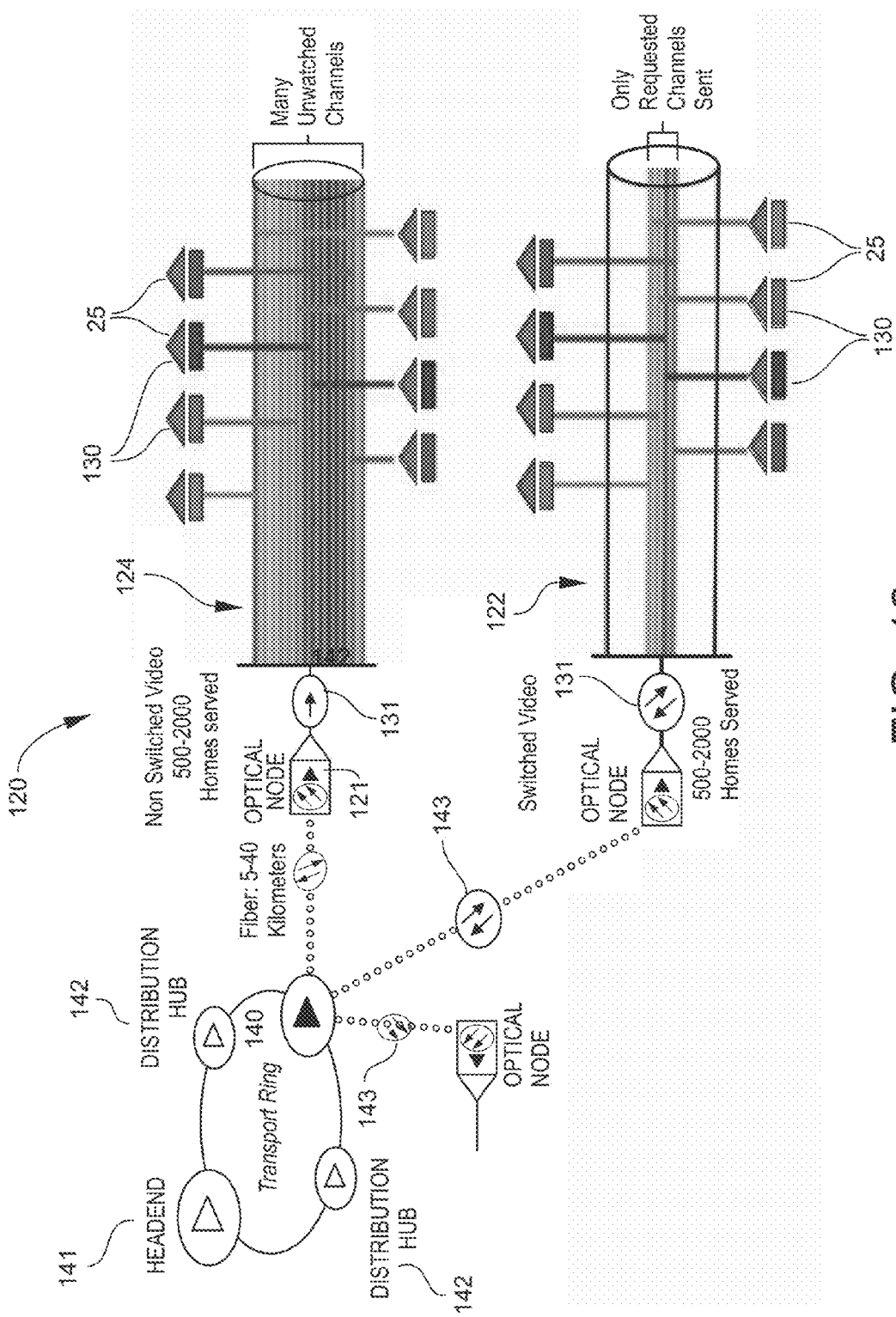
FIG. 12 is an illustration of a Non-Switched Video stream and a Switched Video stream in the present invention.

In current cable TV delivery systems, a fiber optic network 120 extends from the operator's CSHE (head end) carrying all video channels out to a fiber optic node 121 in the network, which services any number of homes 130 ranging from 1 to 2000 (See FIG. 12). From this point, all channels are sent via coaxial cable 131 to each of the homes 130. Note that only a percentage of these homes are actively watching channels at a given time on the non-switched video 124. Rarely are all channels being accessed by the homes in the service group.

In cable TV systems in the United States, equipment in the home 130 sends a channel request signal back to the distribution hub 142. If a channel is not currently being transmitted on the coaxial line 131, the distribution hub allocates a new QAM channel and transmits the new channel to the coaxial cable via the fiber optic node 121. For this to work, the equipment in the home must have two-way communication ability 123. Switched video 122 uses the same mechanisms as video on demand and may be viewed as a non-ending video on demand show that any number of users may share.

In a switched video system 122, the unwatched channels do not need to be sent. Two-way communication 123 is handled differently between cable and Internet Protocol television (IPTV) schemes. IPTV uses Internet communication protocols but requires an entirely new video distribution infrastructure. Cable companies in the United States have elected the less costly approach of upgrading existing infrastructure, and European operators may well take the same approach. In the upgrade approach, various proprietary schemes use specific frequencies for passing messages back to the distribution hub.

The legacy cable operators do not currently stream live content over the public Internet because they lack the technology to do this in a highly efficient manner outside of their Direct Memory Access (DMA) or current subscriber base.

It is predicted that within the next five years wireless access will become the dominant model for the delivery of the Internet to homes and businesses in a manner that is already in wide, but highly localized, use in such places as shopping malls, coffee shops, schools, hotels, airports and even on airplanes. Hotspots (e.g. Wi-Fi networks) are now commonplace and sought after by consumers who know how to find and log-on to wireless Internet. Hotspots have a major limitation in that their range is extremely limited. Hotspots typically have a range of less than 120 feet indoors and less than 350 feet outdoors from an access point. The technology disclosed by the instant invention has the capability to convert larger geographic areas into HOT-SPOTS with 10-40 mile radius areas all able to receive wireless Internet. With the instant invention, so long as customers have Internet access, we can provide live television programming and movies with full (past and future) Cloud-DVR (digital video recording) capability. The instant invention can also provide connections to sites like Hulu, Pandora, Netflix, Facebook, YouTube and any and all things entertainment. Wired connectivity will come under increasing competition from companies offering wireless Internet and in turn the live TV streaming offered by the instant invention. The service area could be limitless with targeted demographics both domestically and internationally. As long as a customer has an Internet connection anywhere in the world, the instant invention will allow that customer to be able to get those TV programs which they have selected in their customized user interface and paid for with their monthly channel subscription.

The FCC categorizes broadband Internet as 4 megabits per second. As of June 2012, 119 million Americans do not have access to broadband Internet. The US government has set a goal for private sector companies to finish building out an infrastructure to reach all 314 million Americans by 2020 using the Connect America Fund. 195 million people are current users of broadband Internet of some kind, including Wi-Fi access, cellular phone, workplace access, etc. The US market size for Internet delivered TV is 62% of the US population with continued growth a government priority. In the US, traditional TV providers (cable, satellite, etc.) control 85% of the market. The biggest complaint with these providers is bundling where customers must buy large TV packages in order to obtain their favorite shows while 90% of the other channels provided in the package are of little interest. This is seen as an unnecessary cost burden on the consumer and one that many resent.

Cell phone companies provide media through either a customer's smart phone or on tablet. These companies are losing the domestic market battle for home TV, but are trying to break new ground by offering programming via their wireless interface. The instant invention will allow our customers to watch live TV via the Internet at home, both hard wired (cable company) and wirelessly (telecom companies and HOT-SPOTS) as well as on any other mobile device such as your phone, smart phone or tablet. Despite the fact that media and content provided by an ever growing list of companies via the Cloud (both wired and wireless) for movies (Netflix), videos (YouTube & Facebook), music (Pandora), TV (mostly tape delayed such as Hulu and Amazon, Apple, Google etc.) as well as a host of other companies both domestically in the US and abroad. Amazingly, to date, no one has been able to provide live HD (1080i) TV streaming in a cost effective low bandwidth model without buffering and pixelating issues. The instant invention accomplishes this because it has the distinct advantage due to its ability to reduce the bandwidth requirements and provide video streaming via Cloud computing infrastructure.

Hybrid Integrated Solution

In the design of the instant invention, we get the best of all worlds because the instant invention:

Utilizes the switched-video concept and bandwidth optimization schemes.

Reduces cost of ownership through network simplification by removing all quadrature amplitude modulation (QAM) equipment from the video network architecture.

Delivers exceptional quality video as well as significant bandwidth savings through the use of Advanced Video Coding (AVC) and High Efficiency Video Coding (HEVC) algorithms.

Delivers value to any network operator/content provider.

The instant invention demonstrates the feasibility of the entire solution model showing it to be a secure, reliable and cost effective method of streaming live TV over the public Internet via highly encrypted point-to-point tunnels. It is also a much more energy efficient (greener) solution and end-to-end architecture. The system provides the underlying infrastructure necessary to create and deliver a truly unique interactive environment that has the potential to literally redefine "Live TV", by providing the platform to quickly and cost effectively implement and launch a vast array of new feature rich services and interactive functionality that the entire TV industry has greatly coveted but has yet to realize. The system also provides substantial new incremental revenue opportunities for the operator/provider by introducing Enhanced (past/future) Cloud-DVR capabilities, One Click Buying, Social Media Integration, as well as integration of many off-the-shelf Internet based enhanced services.

How to Emulate STB Functionality in Software

The instant invention replicates all of the cable STB functionality (both in terms of hardware and software) by establishing a client/server relationship, which utilizes a real-time, direct, point-to-point encrypted connection with every virtual-STB-client within our system. This secure point-to-point client/server system and asynchronous communications "channel" is implemented over HTTPS 169 through an encrypted private tunnel.

Figure 13:
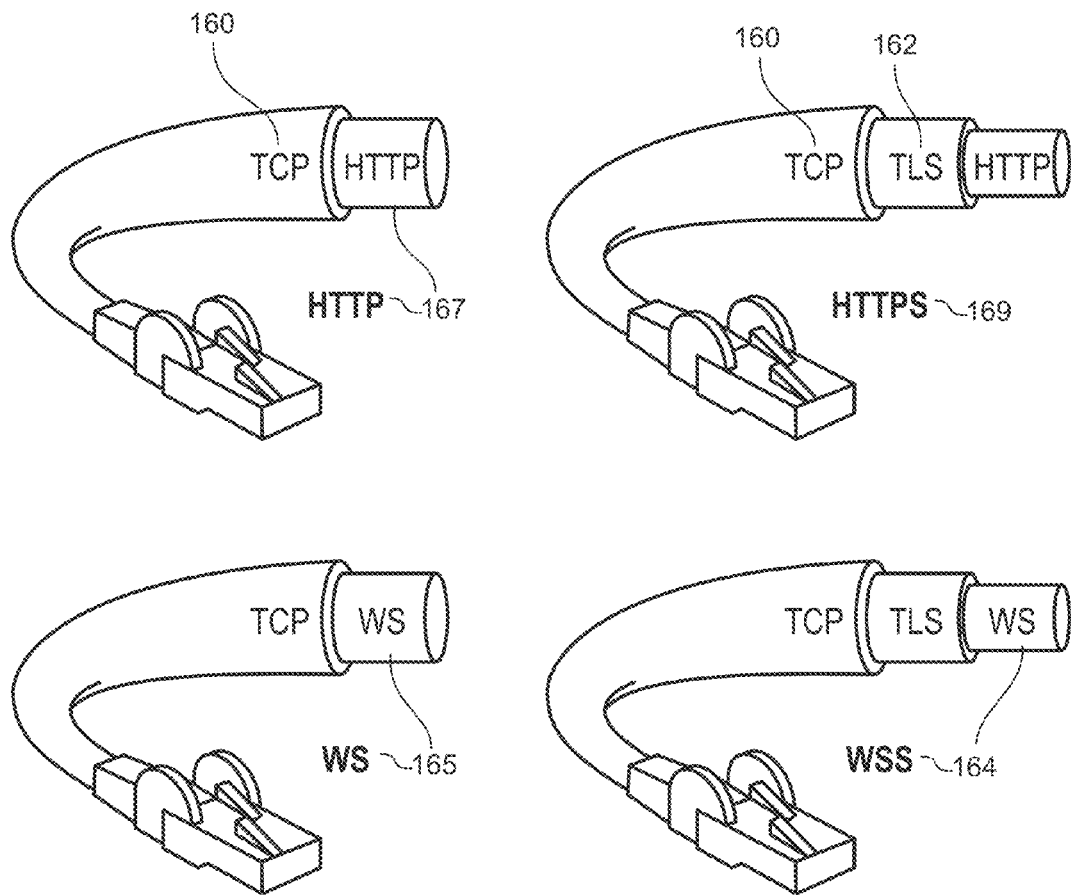
FIG. 13 is an illustration of the connectivity and security of the streaming delivery required in the present invention.

Looking to FIG. 13 which illustrates that Transport Control Protocol (TCP) 160 provides the encapsulation required for Transport Layer Security (TLS) 162, which in turn provides encapsulation for WebSocket Security (WSS) 164. Asynchronous HTTP 167 connectivity mandates that the client application (web Browser) manually request page updates in order to refresh stale content contained in the webpage HTML elements of any static web page. A WebSocket (WS) 165 connection is the sort of IP connectivity that delivers a persistent-connection between server and client; whereby, the dynamic elements within a webpage are updated dynamically, in real-time, automatically by the server without any requirement for input from the client or client application. If the server has data that needs to be updated for a specific client, it does not resend all of the information listed on a particular webpage, it only sends the elements that have changed since the last update.

Socket IO

Figure 14:
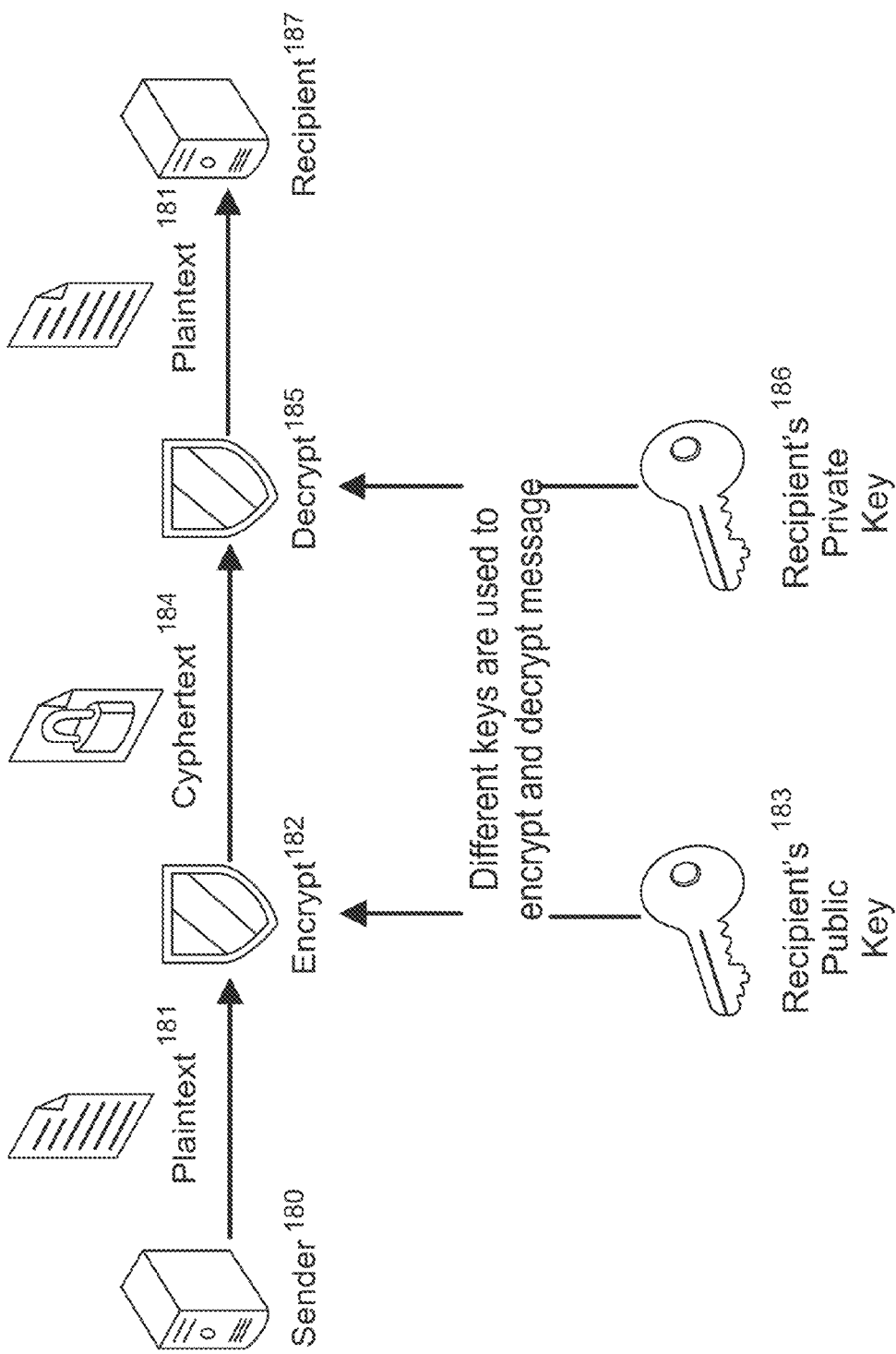
FIG. 14 is an illustration of the streaming, encryption and decryption of content in the present invention.

The instant invention adds another layer at this point that brings in a security component to WS protocol that produces a WSS 164 or WS-Security protocol 165, which delivers a completely secure, real-time, persistent channel connection between Client and Server. The instant invention uses this technology and this is what we are calling Socket-IO. We create a connection between the client and server that will manage all the video streams via Socket-IO over TLS 162 (FIG. 13). After the channel connection is made between the Client and Server, a request for a channel is made (FIG. 14) from the Client/Recipient 187 which is received by the Sender 180. The Sender 180 sends out a plaintext 181 video stream which is then encrypted 182 using one type of encryption key (public encryption key 183 or private encryption key 186) resulting in Ciphertext 184 which is then sent to the Recipient 187. Upon its receipt, the Ciphertext 184 is then decrypted 185 using one type of encryption key (public encryption key 183 or private encryption key 186) resulting in plaintext 181 which is streamed as the content requested by the Client/Recipient.

In this way, the instant invention allows for a one-to-one, point-to-point, secure relationship between the network video-server 180 and each IP based video-client 187, in real-time with that user. Each time the server or client needs to certify security tokens, passwords, or other data, the instant invention accomplishes that in a secure real-time environment. The system assigns a 128-bit AES token for every video stream and update that unique token every 10 seconds; making the video steaming system of the instant invention extraordinarily secure and impervious to any sort of hacking or cracking technique ever created. With this software based virtual STB, the instant invention is set to revolutionize the Live TV marketplace by instantly removing much of the capital expenditure spent on STB hardware along with savings of ongoing OpEx cost associated with powering the hardware components of the STB and all cost associated with the use of that technology today.

Content Protection

Media files containing stream segments may be individually encrypted. When encryption is employed, references to the corresponding key files appear in the index file so that the client can retrieve the keys for decryption. When a key file is listed in the index file, the key file contains a cipher key that must be used to decrypt subsequent media files listed in the index file. Currently HTTP Live Streaming supports AES-128 encryption using 16-octet keys. The format of the key file is a packed array of these 16 octets in binary format. A unique-key is delivered on a one-to-one basis per subscriber per device connection. So each subscriber device has a unique key for content decryption.

The media stream segmenter available from Apple provides encryption and supports three modes for configuring encryption.

1. The first mode allows you to specify a path to an existing key file on disk. In this mode the segmenter inserts the URL of the existing key file in the index file. It encrypts all media files using this key.
2. The second mode instructs the segmenter to generate a random key file, save it in a specified location, and reference it in the index file. All media files are encrypted using this randomly generated key.
3. The third mode instructs the segmenter to generate a new random key file every n media segments, save it in a specified location, and reference it in the index file. This mode is referred to as key rotation. Each group of n files is encrypted using a different key.

Note: All media files may be encrypted using the same key, or new keys may be required at intervals. The theoretical limit is one key per media file, but because each media key adds a file request and transfer to the overhead for presenting the subsequent media segments, changing to a new key periodically is less likely to impact system performance than changing keys for each segment.

The instant invention can serve key files using either HTTP 167 or HTTPS 169. The instant invention may also choose to protect the delivery of the key files using its own session-based authentication scheme. For details, see "Serving Key Files Securely Over HTTPS."

Key files require an initialization vector (IV) to decode encrypted media. The IVs can be changed periodically, just as the keys can.

Figure 15:
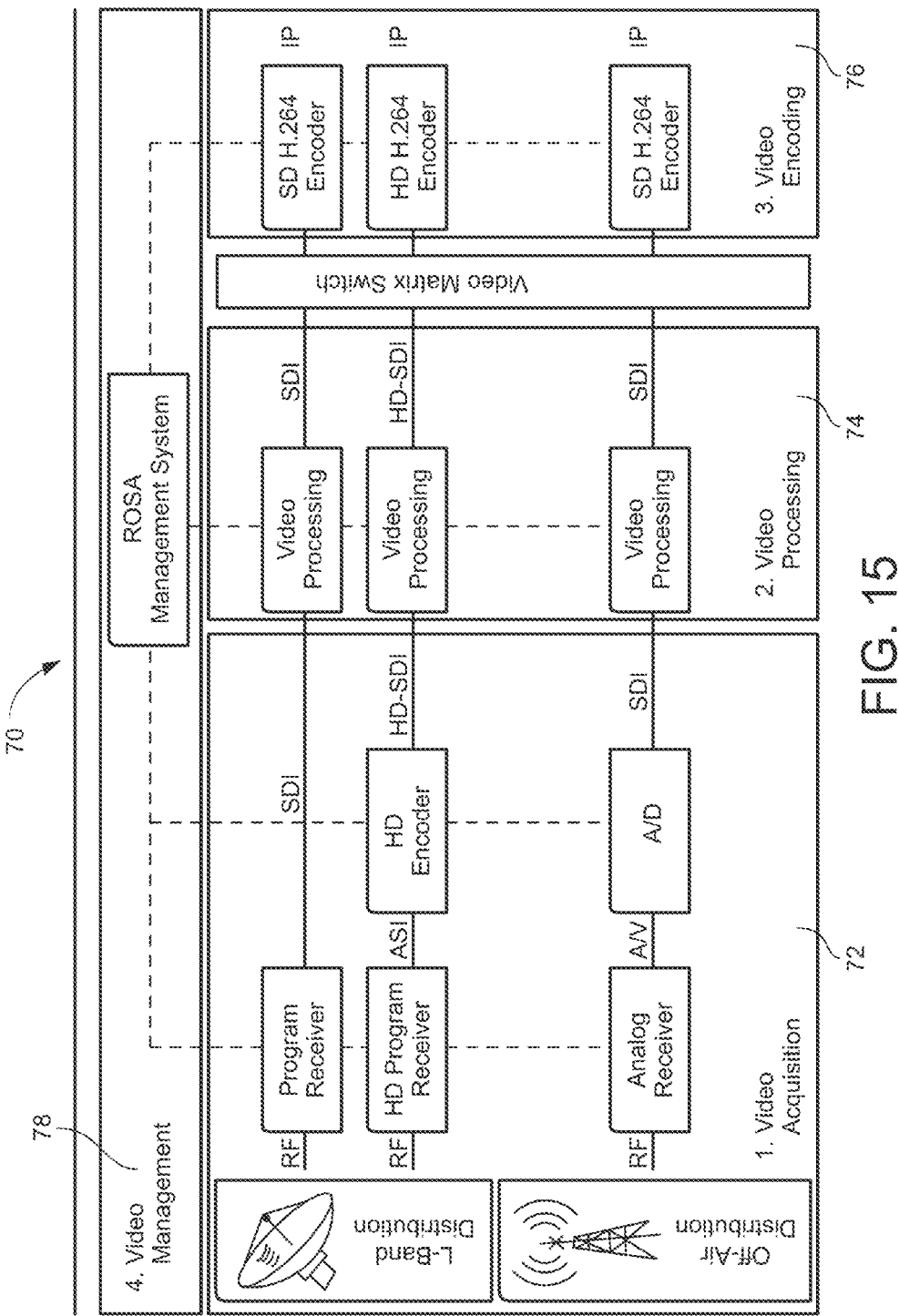
FIG. 15 is an illustration of a Live Streaming TV Content Acquisition, Transformation, & Distribution System in the present invention.

Looking to FIG. 15, there is illustrated an embodiment of a live streaming TV content acquisition, transformation and distribution system 70. As illustrated, there are 4 distinct processes involved which include:

1. Video acquisition 72
2. Video processing, 74
3. Video encoding 76
4. Video management 78

Video acquisition includes acquisition of both Off-Air distribution video streams and L-B and distribution video streams which are acquired through program receivers, high definition program receivers, analog receivers, or a combination thereof. As illustrated in FIG. 15, any analog signal is processed through an analog to digital converter in order to create a serial digital interface (SDI) which is then pass on the video stream to video processing. High-definition signals may be processed by a high-definition decoder which then pass on the video stream the video processing. After the video processing is complete all video streams pass through the video matrix switch, after which they enter video encoding and are processed either as standard definition or high-definition video streams. The video management process 78 manages the other 3 processes.

Figure 16:
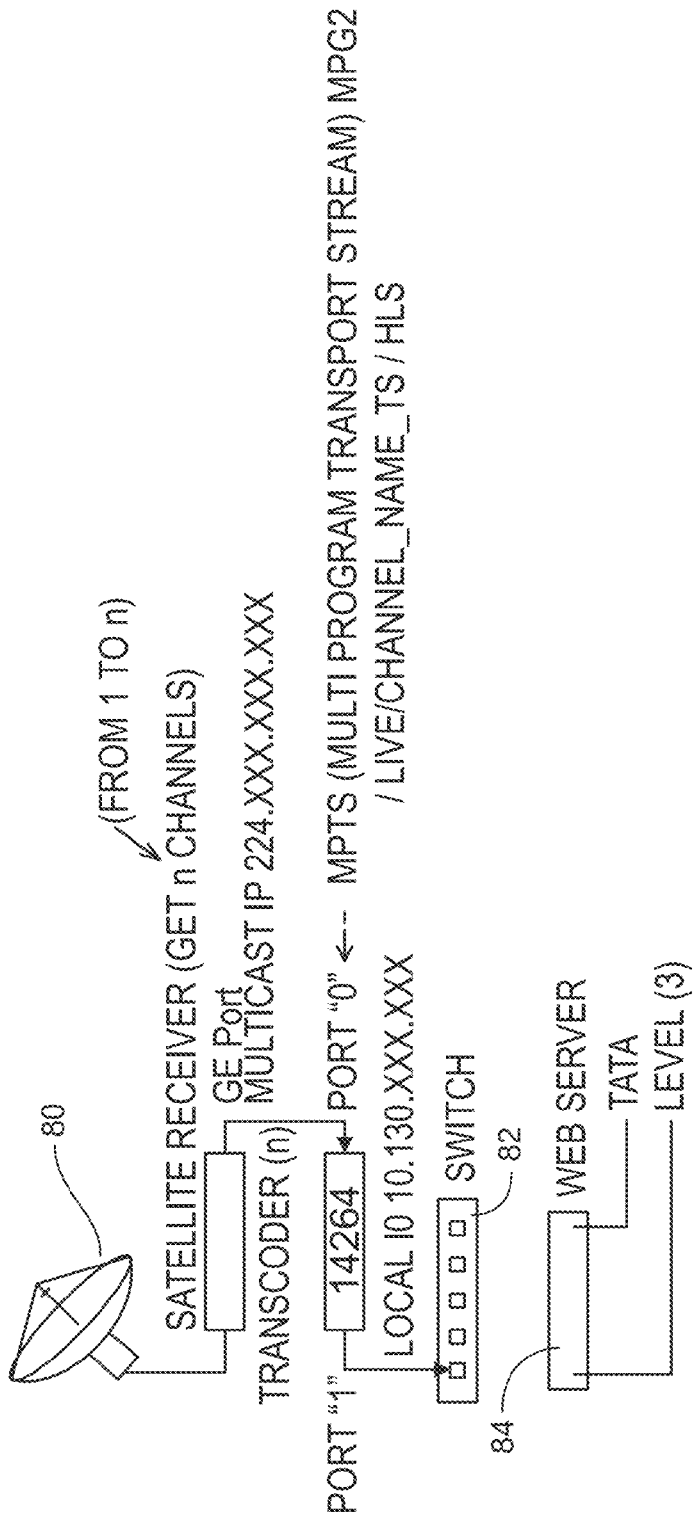
FIG. 16 is an illustration of a Live Streaming TV Content Acquisition, Transformation, & Distribution System in the present invention.
Figure 17:
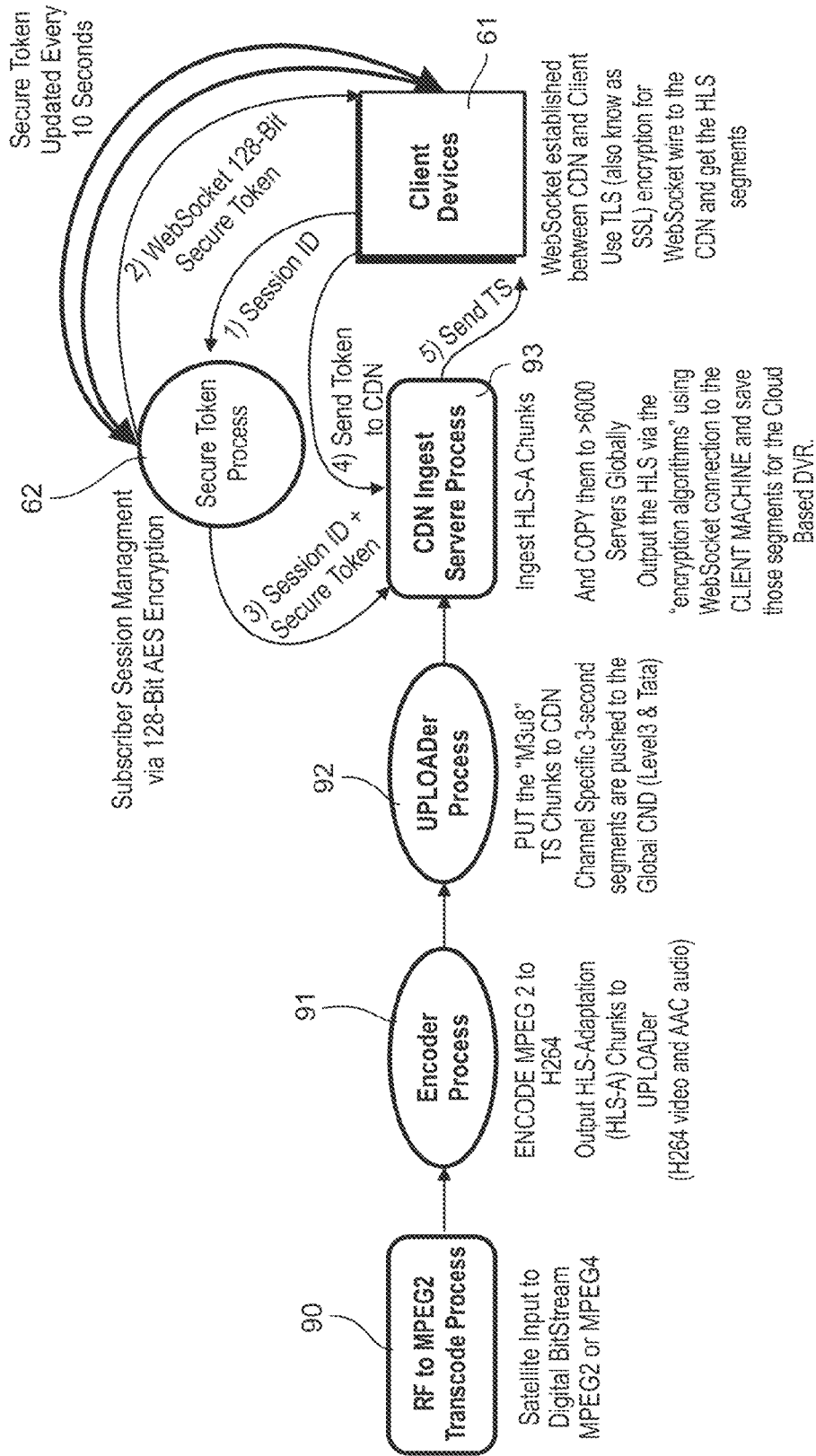
FIG. 17 is an illustration of a Live Streaming TV Content Acquisition, Transformation, & Distribution System in the present invention.

Looking now to FIG. 16, there is illustrated another embodiment of a live streaming TV content acquisition, transformation and distribution system 70. The process begins by transcoding, which is the streaming of live video through transcoder to the CDN. A satellite receiver 80 receives channels through the GE port, after which it passes through transcoder is a multi-program transport stream (MPTS), after which it passes to a switch 82 and then on to a Web server 84 where is distributed to subscribers. FIG. 17. Further illustrates an embodiment of a live streaming TV content acquisition, transformation and distribution system 70. The process begins by acquiring an RF stream and converting it to MPEG-2 or MPEG-4 through a transcode process 90, after which it is passed on to the encoder process 91 where MPEG-2 is encoded to H264. H264 video and AAC audio is then passed on to the uploader process 92 where channel specific 3 seconds segments are pushed to the global content delivery network (CDN). The CDN ingest server process 93 ingests HLS-A chunks and copies them to servers globally, and outputs the HLS via the encryption algorithms using the web socket connection. The client machine described previously. In addition to saving those segments for the cloud based DVR. Web Socket 165 is established between the content delivery network and the client using TLS encryption 162 for the Web Socket connection to the CDN to get the HLS segments. As shown in FIG. 17 session ID is sent from a client device to be secured token process, which then returns a Web Socket secured token, as well as sending a session ID and the secured token to the CDN ingest and server process. The client device then sends a token to the CDN, after which the CDN returns the TS to the client device, allowing the subscriber to view the desired video stream.

Figure 18:
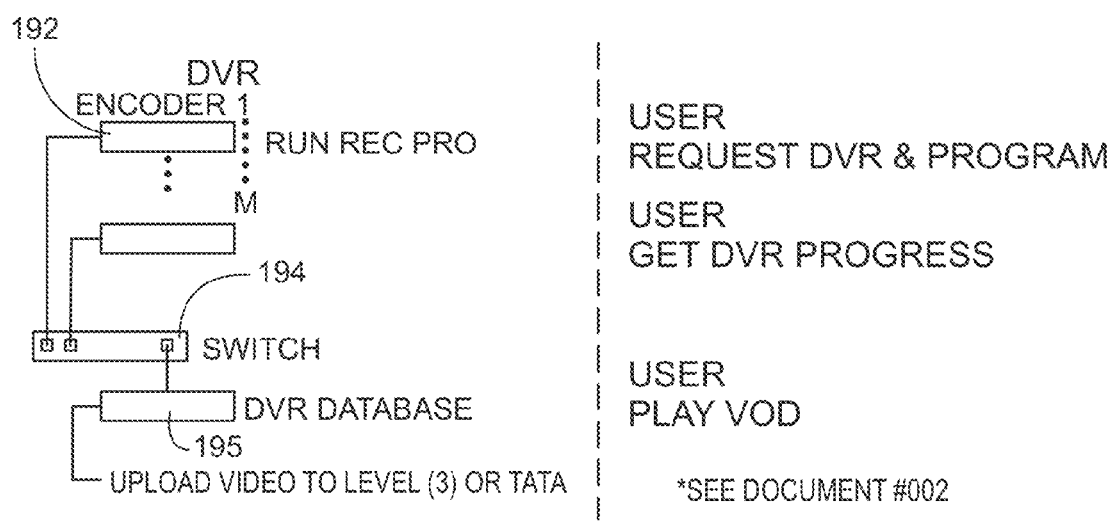
FIG. 18 is an illustration of a Past and Future Cloud Based DVR System in the present invention.
Figure 19:
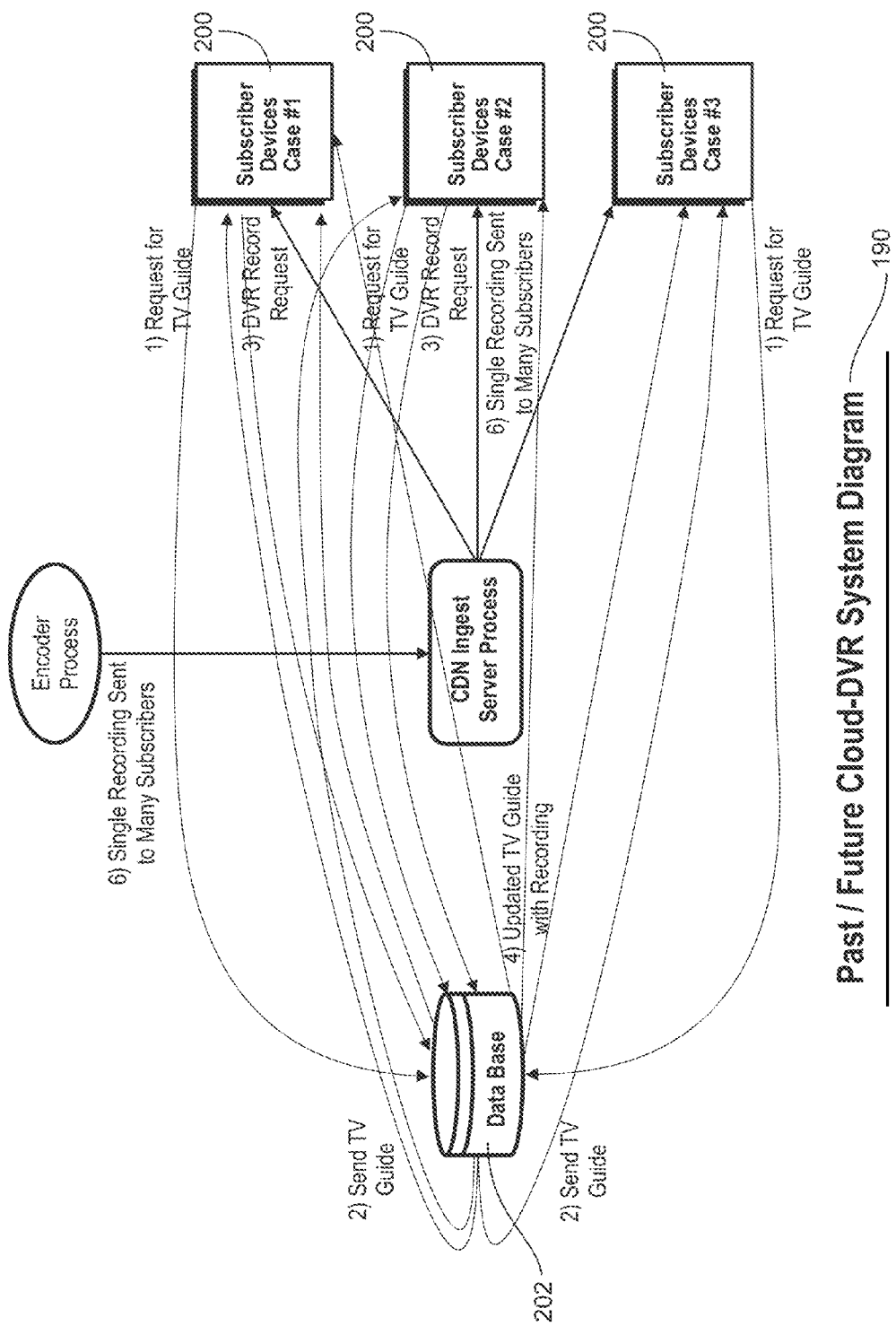
FIG. 19 is an illustration of a Past and Future Cloud Based DVR System in the present invention.

FIG. 18 is an illustration of an embodiment of a Past and Future Cloud Based DVR System 190 in the present invention. A plurality of encoders 192 are operationally associated with one or more switches 194 which are operationally associated with one or more DVR databases 195 which are capable of uploading video streams. In essence, a user requests a DVR program, the user receives a DVR process, thus allowing the user to play the video on demand. Looking now to FIG. 19, which illustrates another embodiment of a Past and Future Cloud Based DVR System in the present invention. The figure shows 3 different key scenarios which include: Case 1:
1. A subscriber uses a subscriber device 200 to send a request to a database 202 for a TV guide
2. The database 202 sends the TV guide to the subscriber in the subscriber device 200
3. The subscriber uses the subscriber device 200 to request a recorded program from the DVR database 202, which then
4. transmits the recorded DVR program to the subscriber device 200

Figure 20:
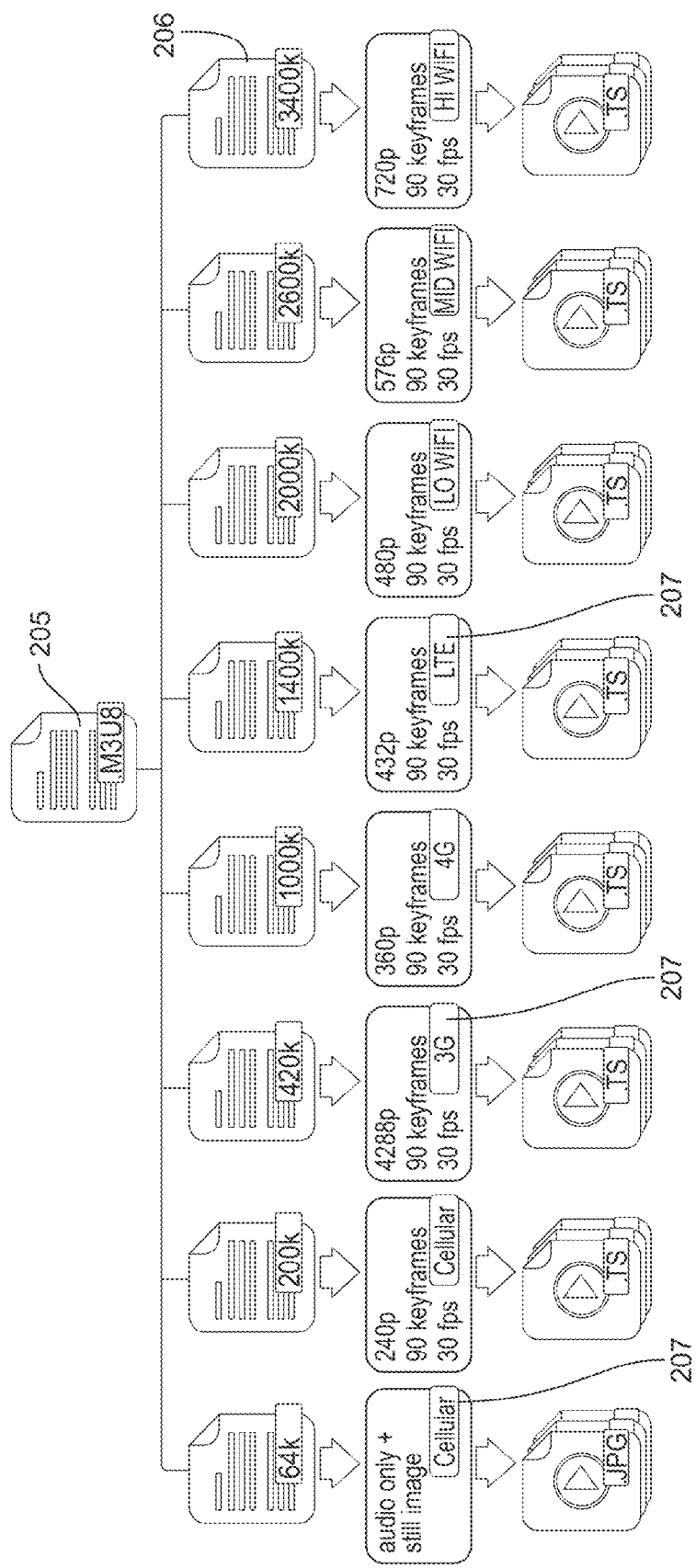
FIG. 20 is an illustration of a M3U8 Segmentation (TS File Segmentation) Method as used in the present invention.

FIG. 20 is an illustration of a M3U8 Segmentation (TS File Segmentation) Method as used in the present invention. M3U is a computer file format that contains multimedia playlists. It originally was designed for audio files, such as MP3, but various software now uses it to play video file lists. M3Us can also point a media player to an online streaming audio source. Numerous media players and software applications support the M3U file format. The Unicode version of "m3u" is "m3u8", which uses UTF-8 Unicode characters. "m3u" and "m3u8" files are the basis for the HTTP Live Streaming format used by Apple™ to stream video and radio to iOS devices. FIG. 20 illustrates the breakdown of an M3U8 file 205 which includes a plurality of sub-files 206 in a variety of formats 207, and in a variety of sizes.

Figure 21:
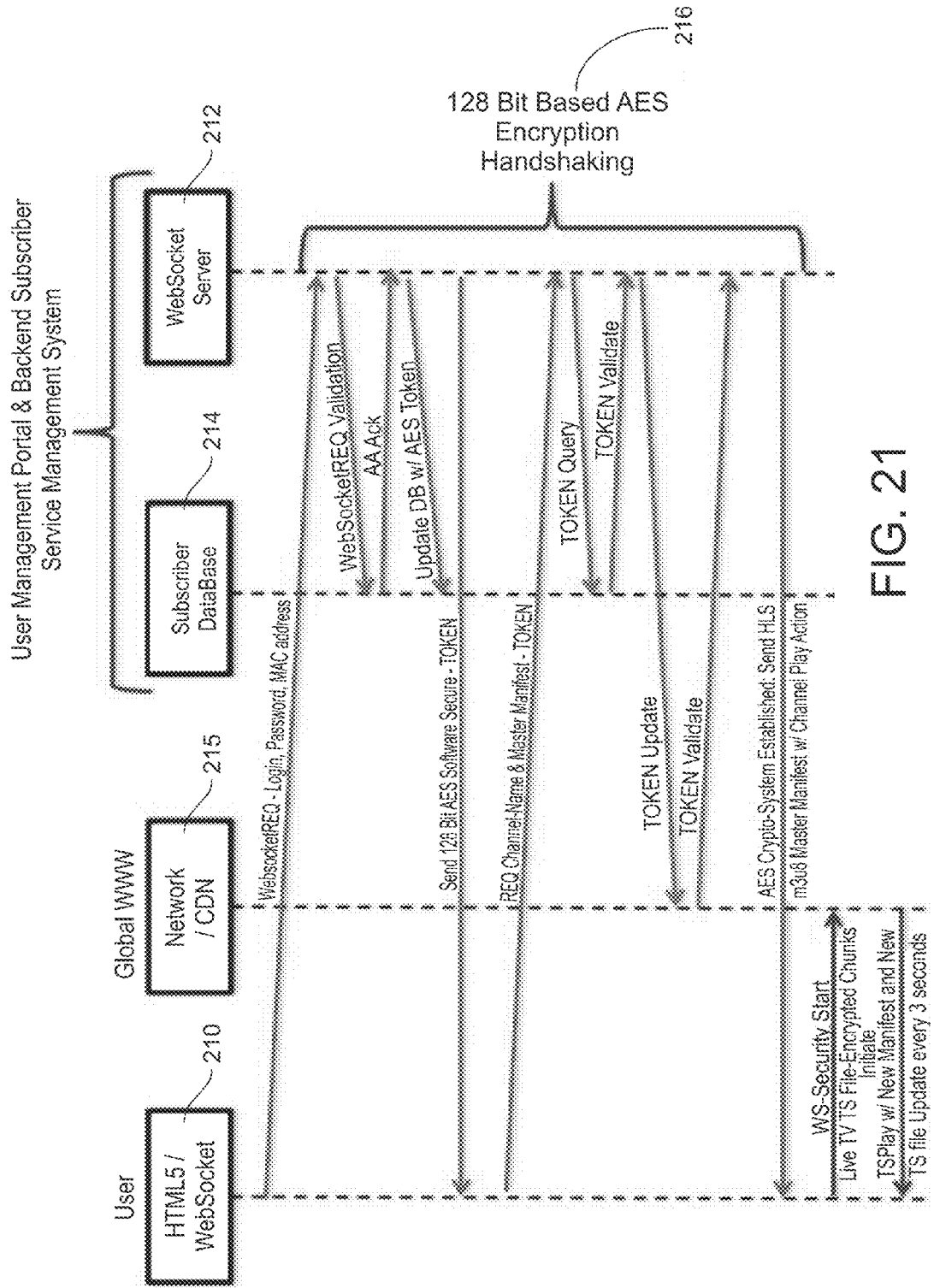
FIG. 21 is an illustration of a DataGram Message Flow Method Diagram as used in the present invention.

FIG. 21 is an illustration of a DataGram Message Flow Method Diagram as used in the present invention. FIG. 21 illustrates one embodiment of a user, from an HTML5/Web Socket 210,
1. making a Web Socket request for a login, a password, and an MAC address to the Web Socket server 212
2. the Web Socket server 212 then sends a Web Socket request validation to a subscriber database 214
3. which then returns a positive or negative validation back to the Web Socket server 212
4. the Web Socket server 212 then updates the database with an AES token while sending an AES software secured token back to the user to 10
5. the user then requests a specific channel or program from the Web Socket server 212 using the token
6. the Web Socket server 212 sends a token query to the subscriber database 214
7. the subscriber database 214 validates the token
8. the Web Socket server 212 updates the token on the Network/CDN 215
9. the Network/CDN 215 validates the token back to the Web Socket server 212
10. the Web Socket server 212 establishes the AES crypto—system and sends the M3U8 manifest with channel play action to the user 210
11. the user 210 then initiates with the Network/CDN 215 and
12. the Network/CDN 215 sends the video stream to the user 210.

The Web Socket server 212 end of the process controls and executes the encryption process 216 during the above process.

FIG. 22 is an illustration of a Secure Token Process according to the present invention. Essentially,
1. the user at the original—SID requests a token
2. if the original SID is authenticated, a UUID-based token is generated
3. the original—SID in the token are saved to the database record and a response to the original—SID is made containing the newly created token In Case 1:
4. the user at the player-SID with the token makes a request for an M3U8 file
5. if the player—SID is authenticated, the response is sent to the player—SID with the M3U8 file
6. the user at the player—SID then requests a description key and if the player—SID is authenticated responses sent containing the necessary decryption key to decrypt the M3U8 file and stream the requested content.

In Case 2:
1. if the token is valid, obtain the original-SID associated with that token and if the original—SID is not null
2. save the player—SID in the database record with the original-SID and token and respond to the player—SID by sending the M3U8 file
3. if the player—SID is valid and if the original-SID is not null, then a response is sent to the player—SID containing a decryption key
4. the record of the original—SID is then deleted.

The instant invention has created and developed a new system and method for secure, intelligent, cost effective delivery of Live (broadcast) Television on a global scale. The solutions, architecture and technology will serve as an industry cornerstone for transport and delivery of the next generation of enhanced, highly enriched media services of all types; including live a la carte programming.

According to another embodiment, the present invention proposes a computer-readable medium on which a program code is saved that implements the operations defined herein, to enable a computer to execute or aid in the execution of delivering audio and video to one or more users according to the present invention.

Those skilled in the art will recognize that the method described above may be implemented in a general purpose computer system. Although not required, at least one embodiment of the invention can be implemented in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

I claim:

1. A virtual set-top-box emulation system for wirelessly delivering audio and video to one or more users comprising:
   a video/audio receiver;
      an encoder process/encoder machine operationally associated with the video/audio receiver;
      an UPLOADer Process/machine operationally associated with the encoder process/encoder machine;
      a Content Delivery Network operationally associated with the UPLOADer Process/machine; and
      one or more client/subscriber machines operationally associated with the Content Delivery Network;
         wherein each said client/subscriber machine is an internet-connected device;
   one or more databases operationally associated with each internet connected device(s);
   a secure token component operationally associated with the databases and the internet connected device(s);
      wherein a client/server relationship is established individually between each internet connected device and the Content Delivery Network through a browser session and a video player on each internet-connected device, and the client/server relationship utilizes a real-time, direct, point-to-point encrypted connection; and
      wherein each internet-connected device(s) request a token from a secure token component;
      wherein the secure token component creates a one-time universally unique identifier for each original internet connected device while also saving the identity of each original internet-connected device and the token and transmitting them to the database;
      wherein the secure token component sends the token back to the client device if the original internet-connected device is valid;
      wherein the original internet-connected device requests an M3U8 packet for a requested stream along with the token, and
      wherein the system sends a decryption key if the token from the original internet-connected device is valid and then deletes the database record from the database.

2. The system of claim 1 wherein the video/audio receiver is selected from the group including, but not limited to, an Over The Air (OTA) Antenna, a satellite receiver, a Standard Cable connection, or directly from a broadcaster's premise.

3. The system of claim 1, wherein the Video/Audio receiver transcodes a wireless Radio Frequency (RF) communication signals or any MPEG2/MPEG4 formatted data and outputs the MPEG2/MPEG4 data to the encoder process/encoder machine.

4. The system of claim 1, wherein the encoder process/encoder machine receives the MPEG2/MPEG4 data and segments that data resulting in an HTTP Live Stream-Adaptation (HLS-A) output.

5. The system of claim 4, wherein the segmentation is achieved using the H264 or H265 technology.

6. The system of claim 1, wherein the UPLOADer Process/ machine transmits said HLS-A output to the Content Delivery Network (CDN).

7. The system of claim 1, wherein the CDN receives copies of the HLS-A output, and outputs the HLS-A via one or more encryption algorithms using WebSocket wire to one or more client/subscriber machines.

8. The system of claim 6, wherein the CDN outputs the HLS-A via one or more encryption algorithms and said output is saved on a Cloud-Digital Video Recorder (C-DVR) system.

9. The system of claim 1, wherein the client/subscriber machines obtain the encrypted HLS-A content via a WebSocket wire and decrypts the HLS-A segments.

10. A method for providing a virtual set-top-box emulation system for wirelessly delivering audio and video to one or more users comprising the steps of:
   providing a Content Delivery Network (CDN);
   providing one or more client/subscriber machines operationally associated with the CDN;
      wherein each said client/subscriber machine is an internet-connected device;
   providing one or more databases operationally associated with each internet connected device(s);
   providing a secure token component operationally associated with the databases and the internet connected device(s);
      establishing a client/server relationship individually between each internet connected device and the CDN through a browser session and a video player on each internet-connected device, and the client/server relationship utilizes a real-time, direct, point-to-point encrypted connection; and
   requesting a token by the internet-connected device(s) from the secure token component;
   creating a one-time universally unique identifier by the securing token component for each original internet connected device;
   saving the identity of each original internet-connected device and the token and transmitting them to the database;
   sending the token back to the client device if the original internet-connected device is valid;
   requesting an M3U8 packet for a requested stream along with the token from the original internet-connected device;
   sending a decryption key from the system if the original internet-connected device is valid; and
   deleting the database record from the database;
   transcoding a wireless communication signal (RF) into an MPEG2/MPEG4 format using a video/audio receiver;
   outputting the MPEG2/MPEG4 data using the video/audio receiver to an encoder process/encoder machine operationally associated with the video/audio receiver;
   segmenting the MPEG2/MPEG4 data using the encoder process/encoder machine resulting in an HTTP live stream-adaptation (HLS-A) output;
   transmitting the HLS-A output with the UPLOADer process / machine operationally associated with the encoder process/encoder machine to a CDN;
   outputting the HLS-A to the CDN via one or more encryption algorithms using a WebSocket wire to the one or more client/subscriber machines.

11. The method of claim 10 wherein the video/audio receiver is selected from the group including, but not limited to, an Over The Air (OTA) Antenna, a satellite receiver, a Standard Cable connection, or directly from a broadcaster's premise.

12. The method of claim 10, wherein the segmentation is achieved using the H264 or H265 technology.

13. The method of claim 10, wherein the CDN outputs the HLS-A via one or more encryption algorithms and said output is saved on a Cloud-Digital Video Recorder (C-DVR).

14. The method of claim 10, wherein the one or more client/subscriber machines obtain the encrypted HLS-A stream from WebSocket wire and decrypt the HLS-A segments dynamically.

15. The method of claim 10 wherein a switched video system is engaged wherein only channels being viewed on an internet connected device are sent/streamed and non-viewed channels are not sent/streamed resulting in a reduction of bandwidth usage.

16. The method of claim 15 wherein Advanced Video Coding and High Efficiency Video Coding algorithms are used to further reduce bandwidth usage.

17. The system of claim 1 wherein a switched video system is engaged wherein only channels being viewed on an internet connected device are sent/streamed and non-viewed channels are not sent/streamed resulting in a reduction of bandwidth usage.

18. The system of claim 17 wherein Advanced Video Coding and High Efficiency Video Coding algorithms are used to further reduce bandwidth usage.

* * * * *